_United States Patent_ [19]

Heusler et al.

[11] 3,755,342

[45] Aug. 28, 1973

[54] CERTAIN 3-MONOSUBSTITUTED-4-THIA-2,6-DIAZABICYCLO[3.2.0]HEPTAN-7-ONES

[75] Inventors: Karl Heusler, Basel; Bruno Fechtig, Reinach, Basel-Land, both of Switzerland

[73] Assignee: Ciba-Geigy Corporation, Ardsley, N.Y.

[22] Filed: Nov. 23, 1970

[21] Appl. No.: 92,297

[30] Foreign Application Priority Data
Nov. 27, 1969 Switzerland.................... 17673/69
June 5, 1970 Switzerland....................... 8465/70

[52] U.S. Cl........ 260/306.7, 260/239 A, 260/243 C
[51] Int. Cl............................................ C07d 99/10

[58] Field of Search......................... 260/306.7

[56] References Cited
UNITED STATES PATENTS
3,522,266  7/1970  Woodward....................... 260/306.7
3,478,048  11/1969  Edenhofer et al. .............. 260/306.7

Primary Examiner—Richard J. Gallagher
Attorney—Harry Goldsmith, Joseph G. Kolodny and Mario A. Monaco

[57] ABSTRACT

2-$R_1$-3-$R_2$-4-thia-2,6-diazabicyclo[3.2.0]heptan-7-one compounds, wherein $R_1$ represents hydrogen or the acyl radical Ac of an organic acid and $R_2$ represents hydrogen or an optionally substituted hydrocarbon radical are useful as intermediates.

4 Claims, No Drawings

CERTAIN 3-MONOSUBSTITUTED-4-THIA-2,6-DIAZABICYCLO[3.2.0]HEPTAN-7-ONES

The present invention relates to 2-substituted thiazolidine compounds, especially 2-$R_1$-3-$R_2$-4-thia-2,6-diazabicyclo[3.2.0]heptan-7-one compounds of formula

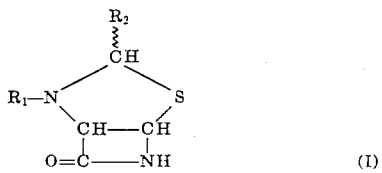

(I)

wherein $R_1$ represents hydrogen or the acyl radical Ac of an organic acid and $R_2$ represents hydrogen or an optionally substituted hydrocarbon radical.

An acyl group Ac primarily represents the acyl radical of an organic carboxylic acid, especially the acyl radical of an optionally substituted aliphatic, cycloaliphatic, cycloaliphatic-aliphatic, aromatic, araliphatic, heterocyclic or heterocyclic-aliphatic carboxylic acid, as well as the acyl radical of a carbonic acid half-derivative.

An optionally substituted hydrocarbon radical $R_2$ is primarily an optionally substituted aliphatic hydrocarbon radical, but can also be an optionally substituted cycloaliphatic, cycloaliphatic-aliphatic, aromatic or araliphatic hydrocarbon radical.

The aliphatic radical of an aliphatic carboxylic acid, formic acid also falling within this concept, is, like the preferred radical $R_2$, an optionally substituted aliphatic hydrocarbon radical, such as an alkyl, alkenyl or alkinyl radical, especially a lower alkyl or lower alkenyl radical, and also a lower alkinyl radical, which can for example contain up to seven, preferably up to four, carbon atoms. Such radicals can optionally be monosubstituted, disubstituted or poly-substituted by functional groups, for example by free, etherified or esterified hydroxyl or mercapto groups, such as lower alkoxy, lower alkenyloxy, lower alkylenedioxy, optionally substituted phenyloxy or phenyl-lower alkoxy, lower alkylmercapto or optionally substituted phenylmercapto or phenyl-lower alkylmercapto, lower alkoxycarbonyloxy or lower alkanoyloxy groups, as well as halogen atoms, and also by nitro groups, optionally substituted amino groups, azido groups, acyl groups, such as lower alkanoyl or benzoyl groups, optionally functionally modified carboxyl groups, such as carboxyl groups present in the salt form, or lower alkoxycarbonyl groups, optionally N-substituted carbamoyl groups, or cyano groups, or optionally functionally modified sulphonic acid groups, such as sulphamoyl groups or sulphonic acid groups present in the salt form.

A cycloaliphatic or cycloaliphatic-aliphatic radical of an appropriate carboxylic acid is, like a radical $R_2$, an optionally substituted cycloaliphatic or cycloaliphatic-aliphatic hydrocarbon radical, for example a monocyclic, bicyclic or polycyclic cycloalkyl or cycloalkenyl group, or cycloalkyl- or cycloalkenyl-lower alkyl or -lower alkenyl group, wherein a cycloalkyl radical for example contains up to 12, such as 3-8, preferably 3-6, ring carbon atoms, whilst a cycloalkenyl radical for example possesses up to 12, such as 3-8, especially 5-8, preferably 5 or 6, ring carbon atoms and 1 to 2 double bonds, and the aliphatic part of a cycloaliphatic-aliphatic radical can for example contain up to seven, preferably up to four, carbon atoms. The above cycloaliphatic or cycloaliphatic-aliphatic radicals can, if desired, be mono-substituted, disubstituted or polysubstituted, for example by optionally substituted aliphatic hydrocarbon radicals, such as those mentioned above, optionally substituted lower alkyl groups or, for example like the abovementioned hydrocarbon radicals, by functional groups.

The aromatic radical of an appropriate carboxylic acid is, like the radical $R_2$, an optionally substituted aromatic hydrocarbon radical, for example a moncyclic, bicyclic or polycyclic aromatic hydrocarbon radical, especially a phenyl radical, as well as a biphenylyl or naphthyl radical, which can optionally be monosubstituted, disubstituted or poly-substituted, for example like the abovementioned aliphatic and cycloaliphatic hydrocarbon radicals.

The araliphatic radical in an araliphatic carboxylic acid is, like the radical $R_2$, an optionally substituted araliphatic hydrocarbon radical, such as an optionally substituted aliphatic hydrocarbon radical which possesses, for example up to three, optionally substituted monocyclic, bicyclic or polycyclic aromatic hydrocarbon radicals, and primarily represents a phenyl-lower alkyl or phenyl-lower alkenyl radical as well as a phenyl-lower alkinyl radical, such radicals for example containing 1–3 phenyl groups and being optionally monosubstituted, disubstituted or poly-substituted in the aromatic and/or aliphatic part, for example like the abovementioned aliphatic and cycloaliphatic radicals.

Heterocyclic radicals in heterocyclic or heterocyclic-aliphatic carboxylic acids are especially monocyclic, as well as bicyclic or polycyclic, azacyclic, thiacyclic, oxacyclic, thiazacyclic, oxazacyclic or diazacyclic radicals, as well as triazacyclic or tetrazacyclic radicals, which are preferably of aromatic character and can optionally be mono-substituted, disubstituted or polysubstituted, for example like the abovementioned cycloaliphatic radicals. The aliphatic part in heterocyclic-aliphatic radicals can for example have the meaning indicated for the corresponding radicals in cycloaliphatic-aliphatic or araliphatic groups.

The acyl radical of a carbonic acid half-derivative is preferably the acyl radical of a carbonic acid half-ester, wherein the esterifying organic radical represents an optionally substituted aliphatic, cycloaliphatic, aromatic or araliphatic hydrocarbon radical or a heterocyclic-aliphatic radical, primarily the acyl radical of a lower alkyl half-ester of carbonic acid which is optionally substituted, preferably in the α-position or β-position (that is to say a lower alkoxycarbonyl radical which is optionally substituted in the lower alkyl part preferably in the α-position or β-position), as well as a lower alkenyl, cycloalkyl, phenyl or phenyl-lower alkyl half-ester of carbonic acid which is optionally substituted in the lower alkenyl, cycloalkyl, phenyl or phenyl-lower alkyl part respectively (that is to say a lower alkenyloxycarbonyl, cycloalkoxycarbonyl phenyloxycarbonyl or phenyl-lower alkoxycarbonyl radical which is optionally substituted in the lower alkenyl, cycloalkyl, phenyl or phenyl-lower alkyl part). Acyl radicals of a carbonic acid half-ester are, furthermore, appropriate radicals of lower alkyl half-esters of carbonic acid, in which the lower alkyl part contains a heterocyclic group, for example one of the abovementioned heterocyclic groups of aromatic character, both the lower alkyl radical and the heterocyclic group being optionally substituted. Such acyl radicals are lower alkoxycarbonyl groups which are optionally substituted in the lower alkyl part and which contain, in the lower alkyl radical, an optionally substituted heterocyclic group of aromatic character.

A lower alkyl radical is for example a methyl, ethyl, n-propyl, isopropyl, n-butyl, isobutyl, sec.-butyl or tert.-butyl group, as well as an n-pentyl, isopentyl, n-hexyl, isohexyl or n-heptyl group, whilst a lower alkenyl radical can for example be a vinyl, allyl, isopropenyl, 2- or 3-methallyl or 3-butenyl group, and a lower alkinyl radical can for example be a propargyl or 2-butinyl group.

A cycloalkyl group is, for example, a cyclopropyl, cyclobutyl, cyclopentyl, cyclohexyl or cycloheptyl group, as well as an adamantyl group, and a cycloalkenyl group is for example a 2- or 3-cyclopentenyl, 1-, 2- or 3-cyclohexenyl or 3-cycloheptenyl group as well as a 2-cyclopropenyl group. A cycloalkyl-lower alkyl or cycloalkyl-lower alkenyl radical is, for example, a cyclopropyl-, cyclopentyl-, cyclohexyl- or cycloheptyl-methyl, -1,1-ethyl or -1,2-ethyl, -1,1-propyl, -1,2-propyl or -1,3-propyl, -vinyl or -allyl group, whilst a cycloalkenyl-lower alkyl or cycloalkenyl-lower alkenyl group for example represents a 1-, 2- or 3-cyclopentenyl-, 1-,2- or 3-cyclohexenyl- or 1-, 2- or 3-cycloheptenyl-methyl, -1,1-ethyl or -1,2-ethyl, -1,1-propyl, -1,2-propyl or -1,3-propyl, -vinyl or -allyl group.

A naphthyl radical is a 1- or 2-naphthyl radical, whilst a biphenylyl group for example represents a 4-biphenylyl radical.

A phenyl-lower alkyl or phenyl-lower alkenyl radical is for example a benzyl, 1- or 2-phenylethyl, 1-, 2- or 3-phenylpropyl, diphenylmethyl, trityl, 1- or 2-naphthyl-methyl, styryl or cinnamyl radical.

Heterocyclic radicals are, for example, monocyclic, monoazacyclic, monothiacyclic or monooxacyclic radicals of aromatic character, such as pyridyl radicals, for example 2-pyridyl, 3-pyridyl or 4-pyridyl radicals, also pyridinium radicals, thienyl radicals, for example 2-thienyl radicals, or furyl radicals, for example 2-furyl radicals, or bicyclic monoazacyclic radicals of aromatic character, such as quinolinyl radicals, for example 2-quinolinyl or 4-quinolinyl radicals, or isoquinolinyl radicals, for example 1-iso-quinolinyl radicals, or monocyclic thiazacyclic or oxazacyclic, as well as diazacyclic, radicals of aromatic character, such as oxazolyl, isoxazolyl thiazolyl or isothiazolyl radicals as well as pyrimidinyl radicals, and also triazacyclic or tetraazacyclic radicals, preferably of aromatic character, such as triazolyl or tetrazolyl radicals. Heterocyclic-aliphatic radicals are lower alkyl or lower alkenyl radicals containing heterocyclic groups, especially those mentioned above.

By etherified hydroxyl groups there are primarily to be understood lower alkoxy groups, for example methoxy, ethoxy, n-propoxy, isopropoxy, n-butoxy, isobutoxy, sec.-butoxy, tert.-butoxy, n-pentoxy or tert.-pentoxy groups, as well as substituted lower alkoxy groups, such as halogen-lower alkoxy groups, especially 2-halogen-lower alkoxy groups, for example 2,2,2-trichlorethoxy, 2-bromethoxy or 2-iodethoxy groups, and also lower alkenyloxy groups, for example vinyloxy or allyloxy groups, lower alkylenedioxy groups, for example methylenedioxy or ethylenedioxy groups as well as iso-propylidenedioxy groups, cycloalkoxy groups, for example cyclopentoxy, cyclohexyloxy or adamantyloxy groups, phenyloxy groups, phenyl-lower alkoxy groups, for example benzyloxy or 1- or 2-phenylethoxy groups, or lower alkoxy groups substituted by monocyclic monoazacyclic, monooxacyclic or monothiacyclic groups of aromatic character, such as pyridyl-lower alkoxy groups, for example 2-pyridylmethoxy groups, furyl-lower alkoxy groups, for example furfuryloxy groups, or thienyl-lower alkoxy groups, for example 2-thenyloxy groups.

As etherified mercapto groups, lower alkylmercapto groups, for example methylmercapto, ethylmercapto or n-butylmercapto groups, lower alkenylmercapto groups, for example allylmercapto groups, phenylmercapto groups or phenyl-lower alkylmercapto groups, for example benzylmercapto groups, should be mentioned.

Esterified hydroxyl groups are primarily halogen atoms, for example fluorine, chlorine, bromine or iodine, as well as lower alkanoyloxy groups, for example acetoxy groups or propionyloxy groups.

Substituted amino groups are monosubstituted or disubstituted amino groups, in which the substituents primarily represent monovalent or bivalent, optionally substituted aliphatic, cycloaliphatic, cycloaliphatic-aliphatic, aromatic or araliphatic hydrocarbon radicals, as well as acyl groups. Such amino groups are especially lower alkylamino or di-lower alkylamino groups, for example methylamino, ethylamino, dimethylamino or diethylamino groups, or lower alkyleneamino groups which are optionally interrupted by hetero-atoms, such as oxygen atoms, sulphur atoms, or nitrogen atoms which are optionally substituted, for example by lower alkyl groups, such as pyrrolidino, piperidino, morpholino, thiomorpholino or 4-methyl-piperazino groups, and also acylamino groups, especially lower alkanoylamino groups, such as acetylamino or propionylamino groups, as well as sulphoamino groups which are optionally present in the salt form, such as the alkali metal salt form, for example sodium salt form, or ammonium salt form.

A lower alkanoyl radical is for example an acetyl or propionyl group.

A carboxyl group present in the salt form is for example a carboxyl group present in the alkali metal salt form or ammonium salt form.

A lower alkoxycarbonyl radical is for example a methoxycarbonyl, ethoxycarbonyl, n-propoxycarbonyl, isopropoxycarbonyl, tert.-butoxycarbonyl or tert.-pentoxycarbonyl group.

Optionally N-substituted carbamoyl groups are for example N-lower alkyl-carbamoyl or N,N-di-lower alkyl-carbamoyl groups, such as N-methyl-, N-ethyl-, N,N-dimethyl- or N,N-diethyl-carbamoyl groups.

A sulphamoyl group can optionally be substituted and can for example represent a N-lower alkyl-sulphamoyl group, such as a N-methyl-sulphamoyl or N,N-dimethyl-sulphamoyl group. Sulphonic acid groups present in the salt form are, for example, sulphonic acid groups present in the alkali metal salt form, for example sodium salt form.

A lower alkenyloxycarbonyl radical is for example the vinyloxycarbonyl group, whilst cycloalkoxycarbonyl and phenyl-lower alkoxycarbonyl groups in which the cycloalkyl and phenyl-lower alkyl radical have the abovementioned meaning, for example represent adamantyloxycarbonyl, benzyloxycarbonyl or diphenylmethoxycarbonyl groups, as well as $\alpha$-4-biphenylyl-$\alpha$-methyl-ethoxycarbonyl groups. Lower alkoxycarbonyl groups in which the lower alkyl radical for example contains a monocyclic monoazacyclic, monooxacyclic or monothiacyclic group, are for example furyl-lower alkoxycarbonyl groups, such as furfuryloxycarbonyl groups, or thienyl-lower alkoxycarbonyl groups, for example 2-thenyloxycarbonyl groups.

The compounds of the present invention can be in the form of mixtures of isomers or of pure isomers.

Particularly valuable compounds are those of formula I, wherein $R_1$ primarily represents hydrogen or alternatively represents an acyl radical Ac' of an organic carboxylic acid which can easily be split off, preferably under acid conditions, for example in the presence of trifluoracetic acid, especially a half-ester of carbonic acid, such as a lower alkoxycarbonyl radical, for example the tert.-butoxycarbonyl radical as well as the tert.-pentoxycarbonyl radical, a cycloalkoxycarbonyl radical, for example adamantyloxycarbonyl radical, a phenyl-lower alkoxycarbonyl radical, for example diphenylmethoxycarbonyl radical, as well as an $\alpha$-4-biphenylyl-$\alpha$-methyl-ethoxycarbonyl radical, or a furyl-lower alkoxycarbonyl radical, for example furfuryloxycarbonyl radical, and $R_2$ represents hydrogen or especially a lower alkyl radical, and primarily represents the isopropyl radical.

The new compounds of formula I can be obtained in a surprising manner if a compound of formula

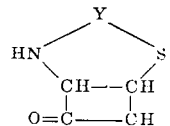

(II)

where Y represents a disubstituted carbon atom, is reacted with an aldehyde of formula $R_2$—CHO (III) or a reactive derivative thereof and, if desired, a resulting compound of formula I, wherein $R_1$ represents a hydrogen atom, is acylated in the 2-position, and/or, if desired, a resulting isomer mixture is resolved into the individual isomers.

In a starting material of formula II, substituents of the disubstituted carbon atom Y are primarily optionally substituted aliphatic hydrocarbon radicals, and especially lower alkyl radcials, preferably methyl radicals, as well as ethyl, n-propyl or isopropyl radicals, but can also be optionally substituted cycloaliphatic, cycloaliphatic-aliphatic, aromatic or araliphatic hydrocarbon radicals, such as cycloalkyl radicals, for example cyclopentyl or cyclohexyl radicals, phenyl radicals or phenyl-lower alkyl radicals, for example benzyl or phenylethyl radicals, or optionally substituted, bivalent hydrocarbon radicals, such as optionally substituted bivalent aliphatic hydrocarbon radicals, especially lower alkylene radicals, for example 1,4-butylene or 1,5-pentylene radicals.

Reactive derivatives of aldehydes of formula III are primarily hydrates or reactive polymeric products of such aldehydes, such as paraformaldehyde, trioxymethylene or paraldehyde.

The above reaction is usually carried out in a solvent, such as an organic solvent which is miscible with water, such as an alcohol or ether which is miscible with water, for example dioxane, or in a suitable mixture of solvents. At the same time, water is preferably added and the process carried out in the presence of an acid agent, such as an inorganic or organic acid, for example an organic carboxylic acid or preferably sulphonic acid, such as p-toluenesulphonic acid, if desired or necessary, with cooling or preferably warming and/or in a closed vessel and/or in an inert gas atmosphere, for example under nitrogen.

Compounds of formula I, wherein $R_1$ has the abovementioned meaning and $R_2$ represents the preferred isopropyl radical, can, surprisingly, be manufactured from easily accessible starting substances, if in a penam compound of formula

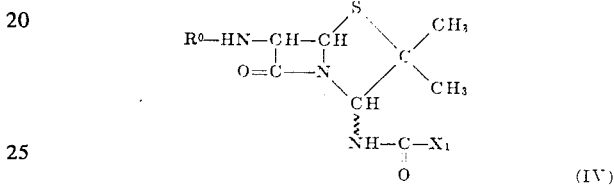

(IV)

(configuration of 6-amino-penicillanic acid), wherein the group —C(=O)—$X_1$ represents a substituted hydroxycarbonyl or mercaptocarbonyl group which can be split under neutral or acid conditions and $R°$ denotes hydrogen or an acyl radical $Ac°$ of an organic acid which can be split off under the conditions of the process, the group —C(=O)—$X_1$ is split under neutral or acid conditions with simultaneous or subsequent treatment with water, and the 4,4-dimethyl-5-thia-2,7-diazabicyclo[4.2.0]oct-2-en-8-one which may be formed is separated off or the carbon-nitrogen double bond therein is reduced, and, if desired, a resulting compound of formula I, wherein $R_1$ represents a hydrogen atom, is acylated in the 2-position and/or, if desired, a resulting isomer mixture is separated into the individual isomers.

An acylamino group $Ac°$—NH— which can be split under the reaction conditions is for example a group of formula —NH—C(=O)—$X_1$, wherein $X_1$ has the abovementioned significance, especially a group of formula —NH—C(=O)—O—$R_o^a$, —NH—C(=O)—O—$R_o^b$, —NH—C(=O)—O—$R_o^c$, —NH—C(=O)—O—$R_o^d$ or —NH—C(=O)—O—$R_o^e$, wherein $R_o^a$, $R_o^b$, $R_o^c$, $R_o^d$ and $R_o^e$ have the meanings given below, but can also represent any other acylamino group which can be split under the reaction conditions.

The splitting of the group —C(=O)—$X_1$ in a starting material of formula IV depends on the nature of this group, the splitting being carried out in the presence of at least one mol of water, normally of an excess of water, or the reaction product being subsequently treated with water.

Substituted hydroxyl or mercapto groups $X_1$ are primarily etherified hydroxyl and mercapto groups, which together with the carbonyl grouping form a functionally modified, primarily esterified, carboxyl or thiocarboxyl group which can be split under neutral or weakly acid conditions.

The group $X_1$ for example represents the radical of formula —O—$R_o^a$, which together with the carbonyl grouping represents an esterified carboxyl group which can easily be split on treatment with chemical reducing agents under neutral or weakly acid conditions. In this group $R_o^a$ denotes a 2-halogen-lower alkyl radical, in which halogen preferably has an atomic weight of above 19. The radical can contain one, two or more halogen atoms, for example chlorine, bromine or iodine atoms, and in particular 2-chloro-lower alkyl radicals, but also 2-bromo-lower alkyl radicals contain several, preferably three, chlorine or bromine atoms, whilst a 2-iodo-lower alkyl radical primarily possesses one iodine atom only. The readical $R_o^a$ in particular represents a 2-polychloro-lower alkyl radical, such as 2-polychlorethyl radical, primarily the 2,2,2-trichlorethyl radical, as well as the 2,2,2-trichloro-1-methyl-ethyl radical, but can also for example denote a 2-polybromo-lower alkyl radical, such as 2,2,2-bromethyl radical, as well as a 2-iodo-lower alkyl radical, for example especially the 2-iodethyl radical.

A further group $X_1$, which together with the carbonyl grouping represents an esterified carboxy group which can be easily split on treatment with chemical reducing agents under neutral or weakly acid conditions, is the group $—O—R_o^b$, wherein $R_o^b$ denotes an arylcarbonylmethyl group. In this, the aryl radical represents a bycyclic, or polycyclic, but especially a monocyclic, optionally substituted aromatic hydrocarbon radical, for example an optionally substituted naphthyl group and primarily an optionally substituted phenyl group. Substituents of such groups are, for example, optionally substituted hydrocarbon radicals, such as lower alkyl radicals, for example methyl, ethyl or isopropyl radicals, and also trifluoromethyl, phenyl or phenyl-lower alkyl, for example benzyl or phenylethyl, radicals, or functional groups, such as free or functionally modified carboxyl groups, for example carboxyl, lower alkoxycarbonyl, such as methoxycarbonyl or ethoxycarbonyl, and also carbamoyl or cyano groups, optionally functionally modified, such as esterified, hydroxyl or mercapto groups, for example halogen atoms, or etherified hydroxyl or mercapto groups, such as lower alkoxy groups, for example methoxy, ethoxy, n-propoxy, isopropoxy, n-butoxy or tert.-butoxy groups, and/or optionally substituted amino groups, such as di-lower alkylamino groups, for example dimethylamino or diethylamino groups, or lower alkanoylamino groups, for example acetylamino groups.

The methyl part of an arylcarbonylmethyl radical $R_o^b$ is preferably unsubstituted, but can optionally possess, as a substituent, an organic radical, for example an optionally substituted aliphatic hydrocarbon radical, such as a lower alkyl group, for example a methyl, ethyl, n-propyl, isopropyl, n-butyl or tert.-butyl group, or a cycloaliphatic, aromatic or araliphatic radical, such as an aryl group, for example an optionally substituted phenyl group, as well as an optionally substituted cycloalkyl group, for example a cyclohexyl group, or an optionally substituted phenyl-lower alkyl group, for example benzyl group.

An arylcarbonylmethyl radical $R_o^b$ is preferably the unsubstituted phenacyl radical, but can also be a phenacyl radical which is substituted in the aromatic part, such as a phenacyl radical substituted by lower alkyl groups, for example methyl groups, lower alkoxy groups, for example methoxy groups, or halogen atoms, for example fluorine, chlorine or bromine atoms.

The splitting off of an esterified carboxyl group of formula $—C(=O)—X_1$, which in the starting material of formula IV can also represent the redical $Ac^o$, and wherein $X_1$ represents the group $—O—R_o^a$ or $—O—R_o^b$, is effected by treatment with a chemical reducing agent in the presence of an at least equimolar amount of water, usually in the presence of an excess of water. The process is carried out under mild conditions, in most cases at room temperature or even with cooling.

Chemical reducing agents are for example suitable reducing metals, as well as reducing metal compounds, for example metal alloys or metal amalgams, and also strongly reducing metal salts. Zinc, zinc alloys, for example zinc copper, or zinc amalgam, and also magnesium are particularly suitable, and these are advantageously used in the presence of hydrogen-releasing agents which together with the metals, metal alloys and metal amalgams can generate nascent hydrogen, zinc, for example, advantageously in the presence of acids, such as organic carboxylic acids, for example lower alkanecarboxylic acids, primarily acetic acid, or acid agents, such as ammonium chloride or pyridine hydrochloride, preferably with the addition of water, and also in the presence of alcohols, especially aqueous alcohols, such as lower alkanols, for example methanol, ethanol or isopropanol, which can optionally be used together with an organic carboxylic acid, and alkali metal amalgams, such as sodium amalgam or potassium amalgam, or aluminum amalgam, in the presence of moist solvents such as ethers or lower alkanols.

Strongly reducing metal salts are primarily chromium-II compounds, for example chromium-II chloride or chromium-II acetate, which are preferably used in the presence of aqueous media containing organic solvents which are miscible with water, such as lower alkanols, carboxylic acids, such as lower alkanecarboxylic acids or derivatives, such as optionally substituted, for example lower alkylated, amides thereof, or ethers, for example methanol, ethanol, acetic acid, dimethylformamide, tetrahydrofurane, dioxane, ethylene glycol dimethyl ether or diethylene glycol dimethyl ether.

The group $X_1$ can also represent the radical of formula $—O—R_o^c$, which together with the carbonyl grouping represents an esterified carboxyl group which can easily be split on irradiation under neutral or weakly acid conditions. In this group, $R_o^c$ represents an arylmethyl group, wherein aryl denotes a bicyclic or polycyclic, but especially a monocyclic, preferably substituted aromatic hydrocarbon radical. Such an aryl radical is primarily an optionally substituted phenyl group, but can also be a naphthyl group, such as a 1- or 2-naphthyl group. Substituents of such groups are, for example, optionally substituted hydrocarbon radicals, such as lower alkyl, phenyl or phenyl-lower alkyl radicals, which can optionally contain functional groups, such as those given below, as substituents, or, primarily, functional groups, such as free or functionally modified carboxyl groups, for example carboxy lower alkoxycarbonyl, such as methoxycarbonyl or ethoxycarbonyl, carbamoyl or cyano groups, optionally substituted amino groups, such as di-lower alkylamino groups, or acyl groups, such as lower alkanoyl groups, for example acetyl groups, but especially optionally functionally modified, especially esterified, hydroxyl or mercapto groups, such as acyloxy groups, for example lower alkanoyloxy groups, such as acetoxy groups, or halogen atoms, for example fluorine, chlorine or bromine atoms, primarily etherified hydroxyl or mercapto groups, such as lower alkoxy groups, for example methoxy, ethoxy, n-propoxy, isopropoxy, n-butoxy or tert.-butoxy groups, and also lower alkylmercapto groups, for example methylmercapto or ethylmercapto groups (which in the case of the preferred phenyl radical primarily are in the 3-, 4- and/or 5-position) and/or above all nitro groups (in the case of the preferred phenyl radical, preferably in the 2-position).

The methyl part of an arylmethyl radical $R_o^c$ can optionally, for example like the methyl part in the arylcarbonylmethyl radical $R_o^b$, preferably possess an optionally substituted hydrocarbon radical as a substituent.

A radical $R_o^c$ is in particular an optionally substituted α-phenyl-lower alkyl radical or benzhydryl radical, such as a 1-phenylethyl or benzhydryl radical, above all a benzyl radical, which is primarily substituted by lower alkoxy groups, such as methoxy groups, preferably in the 3-, 4- and/or 5-position, and/or by nitro groups, preferably in the 2-position, and especially the 3- or 4-methoxybenzyl, 3,5-dimethoxybenzyl, 2-nitrobenzyl or 4,5-dimethoxy-2-nitrobenzyl radical.

In a starting material of formula IV, wherein $X_1$ represents a radical of formula $—O—R_o{}^c$, the group of formula $—C(=O)—X_1$, which in the starting material can also represent the group $Ac^o$, can be split by irradiation with light, preferably with ultraviolet light. In doing so, light of longer or shorter wavelengths is used depending on the nature of the substituent $R_o^c$. Thus, for example, groups of formula $—C(=O)—O—R_o^c$, wherein $R_o^c$ represents an arylmethyl radical, especially a benzyl radical, which is substituted by a nitro group in the 2-position of the aryl radical and optionally possesses further substituents, such as lower alkoxy groups, for example methoxy groups, for example the 4,5-dimethoxy-2-nitrobenzyl radical, are split by irradiation with ultraviolet light of a wavelength range of above 290 μ, whilst those in which $R_o^c$ represents an arylmethyl radical, for example benzyl radical, which is optionally substituted in the 3-, 4- and/or 5-position, for example by lower alkoxy groups and/or nitro groups, are split by irradiation with ultraviolet light with a wavelength range of below 290 μ. In the first case, one works with a high pressure mercury vapour lamp, pyrex glass preferably being employed as a filter, for example at a main wavelength range of about 315 μ, whilst in the latter case with a low pressure mercury vapour lamp, for example at a main wavelength range of about 254 μ.

The irradiation reaction is carried out in the presence of a suitable polar or non-polar organic solvent or mixture; solvents are, for example, optionally halogenated hydrocarbons, such as optionally chlorinated lower alkanes, for example methylene chloride, or optionally chlorinated benzenes, for example benzene, and also alcohols, such as lower alkanols, for example methanol, or ketones, such as lower alkanones, for example acetone. The reaction is preferably carried out at room temperature or, if necessary, with cooling, usually in an inert gas atmosphere, for example a nitrogen atmosphere. The reaction is preferably carried out in the presence of water; however, it is also possible to treat the irradiation product subsequently with water, for example by effecting the working up of the product obtained in the presence of water.

A group $X_1$ can also represent the radical of formula $—O—R_o^d$, which together with the carbonyl grouping forms an esterified carboxyl group which can be easily split under acid conditions. Such a radical $R_o^d$ is primarily a methyl group, which is monosubstituted by a carbocyclic aryl group possessing electron-donating substituents or by a heterocyclic group of aromatic character possessing oxygen atoms or sulphur atoms as ring members, or, in an oxacycloaliphatic or thiacycloaliphatic radical, forms the ring member which represents the α-position relative to the oxygen atom or sulphur atom.

A carbocyclic aryl group which in the aryl radical contains electron-donating substituents is a bicyclic or polycyclic, especially monocyclic, aryl radical, for example naphthyl radical and primarily phenyl radical. Electron-donating substituents which are preferably in the p-position and/or o-position of the aryl radical are, for example, free or preferably functionally modified, such as esterified and primarily etherified, hydroxyl groups, such as lower alkoxy groups, for example methoxy groups, and also ethoxy or iso-propoxy groups, as well as appropriate free or functionally modified mercapto groups, and also aliphatic, cycloaliphatic, aromatic or aralipathic, optionally suitably substituted, hydrocarbon radicals, especially lower alkyl groups, for example methyl or tert.-butyl groups, or aryl groups, for example phenyl groups.

A heterocyclic groups of aromatic character containing oxygen atoms or sulphur atoms as ring members can be bicyclic or polycyclic, but is primarily monocyclic and above all represents a furyl radical, for example 2-furyl radical, or a thienyl radical, for example 2-thienyl radical.

An oxacycloaliphatic and thiacycloaliphatic radical linked in the α-position is primarily a 2-oxacycloalkyl or 2-thiacycloalkyl group, or a 2-oxacycloalkenyl or 2-thiacycloalkenyl group, in which the methyl group $R_o^d$ represents the ring member adjacent to the ring oxygen atom or ring sulphur atom, and which preferably contains 4–6 ring carbon atoms, primarily a 2-tetrahydrofuryl, 2-tetrahydropyranyl or 2,3-dihydro-2-pyranyl radical or a corresponding sulphur analogue.

Preferred radicals $R_o^d$ are 4-methoxybenzyl and 3,4-dimethoxybenzyl radicals, as well as 2-tetrahydrofuryl, 2-tetrahydropyranyl or 2,3-dihydro-2-pyranyl groups.

In an esterified carboxyl group $—C(=O)—X_1$ which can also be split under acid conditions, the group $X_1$ can also represent the radical of formula $—O—R_o^e$, wherein $R_o^e$ is preferably a methyl radical displaying multiple substitution and preferably containing optionally substituted and/or polyvalent hydrocarbon radicals, such as a lower alkyl group with multiple branching in the α-position, especially the tert.-butyl group or tert.-pentyl group, and also a cycloalkyl group, for example adamantyl group, a polyarylmethyl group, for example a benzhydryl or trityl group, or a 2-(4-biphenylyl)-1-methyl-ethyl group.

In a starting material of formula IV, wherein $X_1$ represents a group of formula $—O—R_o^d$ or $—O—R_o^e$, the grouping of formula $—C(=O)—O—R_o^d$ or of formula $—C(=O)—O—R_o^e$, which in the starting material can also represent the group $Ac^o$, can be split by treatment with an acid agent, especially with an acid, such as a strong organic carboxylic acid, for example an optionally substituted lower alkanecarboxylic acid which preferably contains halogen atoms, such as acetic acid or trifluoracetic acid, and also with formic acid or a strong organic sulphonic acid, for example p-toluenesulphonic acid. Herein, an excess of an acid reagent which is liquid under the reaction conditions is usually employed as the diluent and the process is carried out in the presence of at least an equivalent quantity of water, either at room temperature or with cooling, for example to about −20°C to about +10°C. If, in the starting material, Ac° represents a group of formula $-C(=O)-O-R_o^a$ or $-C(=O)-O-R_o^e$, such a group can simultaneously be split off during the treatment with the acid agent.

The 4,4-dimethyl-5-thia-2,7-diazabicyclo[4.2.0]oct-2-en-8-one which may be formed as an intermediate and which in particular arises during the non-reductive splitting of a group of formula $-C(=O)-X_1$ in the starting material of formula IV, wherein $X_1$ represents the group of formula $-O-R_o^c$ or $-O-R_o^a$, and also during the splitting of a group of formula $-C(=O)-X_1$ in the starting material wherein $X_1$ represents the group of formula $-O-R_o^a$, can be converted into the desired 3-isopropyl-4-thia-2,6-diazabicyclo[3.2.0]heptan-7-one by exhaustive reduction, or be separated from a mixture with the latter. For the reduction of the carbon-nitrogen double bond in the 4,4-dimethyl-5-thia-2,7-diazabicyclo[4.2.0]oct-2-en-8-one, which takes place with simultaneous rearrangement to give 3-isopropyl-4-thia-2,6-diazabicyclo[3.2.0]heptan-7-one, chemical reducing agents are preferably employed, primarily reducing metals or metal compounds, such as those mentioned above, preferably in the presence of hydrogen-releasing agents, especially zinc in the presence of an acid, such as acetic acid, or of an alcohol. A mixture of the 3-isopropyl-4-thia-2,6-diazabicyclo[3.2.0]heptan-7-one and the 4,4-dimethyl-5-thia-2,7-diazabicyclo[4.2.0]oct-2-en-8-one, such as is primarily produced on reductive splitting of the group of formula $-C(=O)-X_1$ in a starting material of formula IV, wherein $X_1$ denotes a group of formula $-O-R_o^a$ or $-O-R_o^b$, can be separated into the individual compounds according to methods of separation which are in themselves known, for example by fractional crystallisation, adsorption chromatography (column chromatography or thin layer chromatography) or other suitable methods of separation.

The introduction of an acyl group Ac, especially of an acyl group Ac' which can easily be split off, primarily under acid conditions, into a resulting compound of formula I, wherein $R_1$ represents hydrogen, can take place by methods in themself known. Here, the customary acylating agents are employed, such as an acid or its reactive derivatives, the former for example in the presence of a suitable condensation agent, such as a carbodimmide, for example dicyclohexylcarbodiimide, and the latter, if necessary, in the presence of a basic agent, such as an organic tertiary base, for example triethylamine or pyridine. Reactive derivatives of acids are anyhydrides, including mixed anhydrides which can in particular be produced with halogenoformic acid esters, for example chloroformic acid ethyl ester, or halogenacetic acid halides, for example trichloracetic acid chloride, and also halides, primarily fluorides or chlorides, or reactive esters, such as esters of acids which alcohols or phenols containing electron-attracting groupings, and with N-hydroxy compounds, for example cyanomethanol, p-nitrophenol or N-hydroxysuccinimide. The acylation can also be carried out stepwise, for example by treating a resulting compound of formula I, wherein R represents hydrogen, with a carbonic acid dihalide, especially phosgene, and reacting a resulting compound of formula I, wherein $R_1$ denotes a halogenocarbonyl group, with a suitable alcohol, for example an optionally substituted lower alkanol, such as tert.-butanol, 2,2,2-trichlorethanol or phenacyl alcohol.

Mixtures of isomers obtainable according to the above processes can be separated into the individual isomers according to methods which are in themselves known, for example by fractional crystallisation, adsorption chromatography (column chromatography or thin layer chromatography or other suitable separation methods. Resulting racemates with salt-forming groups, into which suitable substituents can be temporarily introduced in the customary manner with a view to the separation of the racemate, can be separated into the antipodes in the customary way, for example by forming a mixture of diastereoisomeric salts with optically active salt-forming agents, separating the mixture into the diastereoisomeric salts and converting the separated salts into the free compounds, or by fractional crystallisation from optically active solvents.

The above process also encompasses those embodiments according to which compounds arising as intermediate products, such as 4,4-dimethyl-5-thia-2,7-diazabicyclo[4.2.0]oct-2-en-8-one, are used as starting substances and the remaining process stages are carried out with these, or the process is stopped at any stage; furthermore, starting substances can be used in the form of derivatives, for example of salts, or can be formed during the reaction.

The starting substances of formula II are known (see for example Austrian Pat. No. 264,533) or can be manufactured according to processes which are in themselves known.

The starting substances of formula IV can for example be manufactured if a penam-3-carboxylic acid compound Va of formula

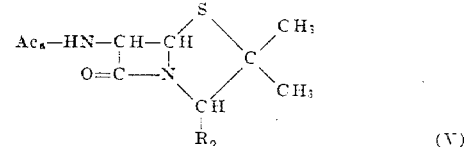

(V)

in which $Ac_a$ represents the acyl radical of an organic carboxylic acid, wherein free functional groups, such as hydroxyl, mercapto and especially amino and carboxyl groups, are optionally protected, for example by acyl groups or in the form of ester groups, and $R_o$ represents a carboxyl group $-C(=O)-OH$ (compound Va), or a salt thereof, is converted into the corresponding acid azide compound of formula V, wherein $R_o$ represents the azidocarbonyl radical $-C(=O)-N_3$ (compound Vb), the latter compound is converted, with elimination of nitrogen, into the corresponding isocyanate compound of formula V, wherein $R_o$ denotes the isocyanato group $-N=C=O$ (compound Vc), and simultaneously or subsequently treated with a compound of formula $H-X_1$ (VI), and, in a resulting compound, an acyl radical $Ac_a$ which cannot be split off under the conditions of the process according to the invention is replaced by hydrogen and, if desired, a resulting compound is converted into another compound of formula IV and/or, if desired, a resulting isomer mixture is resolved into the individual isomers.

An acyl group $Ac_a$ occurring in the compounds of formula V can represent any acyl radical of an organic carboxylic acid with optionally protective functional groups, primarily an acyl radical contained in naturally occurring or biosynthetically produced N-acyl derivatives of 6-amino-penam-3-carboxylic acid compounds, such as a monocyclic aryl-acetyl or aryloxyacetyl radical, and also an optionally substituted lower alkanoyl or lower alkenoyl radical, for example the 4-hydroxyphenylacetyl, hexanoyl, octanoyl, 3-hexenoyl, 5-amino-5-carboxy-valeroyl, n-butylmercaptoacetyl or allylmercaptoacetyl radical, especially the phenylacetyl or phenyloxyacetyl radical, or can represent an acyl radical which can be easily split off, preferably under acid conditions, such as one of the abovementioned acyl radicals of half-esters of carbonic acid.

The conversion of an acid compound Va or of a suitable salt, especially an ammonium salt, into the corresponding acid azide Vb can for example be effected by conversion into a mixed anhydride (for example by treatment with a halogenoformic acid lower alkyl ester, such as chloroformic acid ethyl ester, in the presence of a basic agent such as triethylamine) and treatment of such an anhydride with an alkali metal azide, such as sodium azide, or an ammonium azide, for example benzyltrimethylammonium azide. The acid azide compound Vb thus obtainable can be converted into the desired isocyanate compound Vc in the absence or presence of a compound of formula VI under the reaction conditions, for example on warming, and the isocyanate compound usually does not require isolation and can be directly converted, in the presence of a compound of formula VI, into the desired starting material.

The reaction with a compound of formula VI, especially with an alcohol of formula $R_o{}^a$—OH, $R_o{}^b$—OH, $R_o{}^c$—OH or $R_o{}^d$—OH, such as with a 2-halogenethanol $R_o{}^a$—OH, for example with 2,2,2-trichlorethanol or 2-bromethanol, an arylcarbonylmethanol $R_o{}^b$—OH, for example phenacyl alcohol, or an arylmethanol $R_o{}^c$OH or $R_o{}^d$—OH, for example 4,5-dimethoxy-2-nitrobenzyl alcohol or 4-methoxybenzyl alcohol, is optionally carried out in an inert solvent, for example in a halogenated hydrocarbon, such as carbon tetrachloride, chloroform or methylene chloride, or in an aromatic solvent, such as benzene, toluene or chlorobenzene, preferably with warming.

An acyl group $Ac_a$ which cannot be split off under the reaction conditions of the process according to the invention, especially an acyl group which differs from the radical of formula —C(=O)—$X_1$, can be split off in a manner which is in itself known, if desired after protection of functional groups in such a radical (for example by acylation, esterification or silylation) or after liberation of protected functional groups in such a radical (for example by hydrolysis, reduction or treatment with an acid), for example by treatment with a suitable inorganic acid halide, such as phosphorus pentachloride, preferably in the presence of a basic agent, such as pyridine, to form an imide-halide, reaction of the imide-halide with an alcohol, such as a lower alkanol, for example methanol, and splitting the imino-ether, for example in an aqueous medium, preferably under acid conditions. The acyl radical of a suitable half-ester of carbonic acid, such as of a carbo-lower alkoxy radical which can be split off under acid conditions, for example the carbo-tert.-butoxy, carbo-tert.-pentoxy, carboadamantyloxy or carbodiphenylmethoxy radical, can for example be split off by treatment with trifluoracetic acid.

Starting substances of formula IV obtainable according to the process can be converted into one another. Thus, for example, an aliphatically bonded chlorine atom and especially a bromine atom, in the radical $X_1$, such as in the 2-bromethoxy radical, can for example be replaced by an iodine atom by treatment with a suitable iodine salt, such as an alkali metal iodide, for example potassium iodide, in a suitable solvent, such as acetone; for example, the 2-bromethyl radical can be converted into the 2-iodethyl radical.

It is further possible, in starting substances of formula IV wherein R° denotes hydrogen, to replace the latter in a known manner, for example with the aid of the acylation process described above, by an acyl group Ac° which can be split off under the reaction conditions and is replaceable by hydrogen.

The compounds of formula I represent valuable intermediate products which can be converted into starting substances in a simple manner and which are in particular suitable for the manufacture of pharmacologically valuable compounds, for example of the 7-N-acylamino-cephalosporanic acid type, which are active against micro-organisms, such as gram-positive and gram-negative bacteria.

Thus, it is possible to react a compound of formula I, wherein $R_1$ represents an acyl radical Ac, primarily an acyl radical Ac' which can be easily split off, especially under acid conditions, with a 3,3-diformyl-acrylic acid-$R_3{}^A$-ester of formula

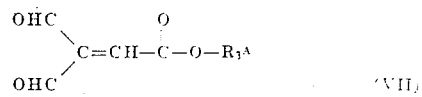

wherein $R_3{}^A$ represents an organic radical of an alcohol which is preferably easily replaceable by hydrogen, or a tautomer thereof, customarily in the absence of a condensation agent, and to convert a resulting 2-(2-Ac-3-$R_2$-7-oxo-2,6-diaza-4-thia-6-bicyclo[3.2.0]heptyl)-3,3-diformyl-propionic acid $R_3{}^A$ ester of formula

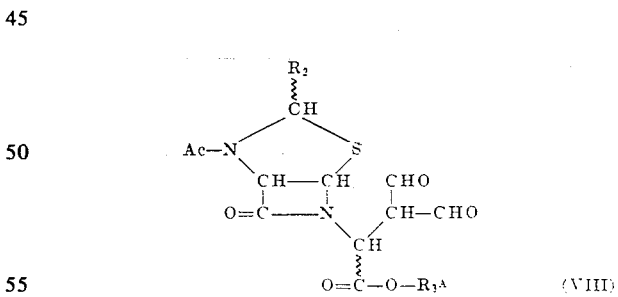

by treatment with an acid agent into a 7-amino-3-formyl-ceph-2-em-4-carboxylic acid $R_3{}^A$-ester of formula

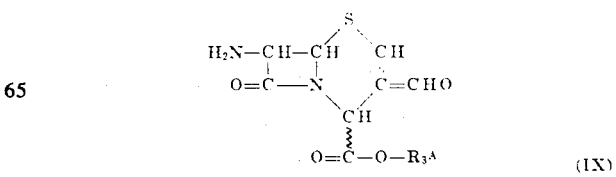

he latter can be converted into the 7-amino-cephalosporanic acid and its N-acyl derivatives, for example according to the method described in Austrian Pat. No. 264,537.

In the 3,3-diformyl-acrylic acid $R_3^A$-ester the organic radical of an alcohol $R_3^A$ primarily represents one of the groups $R_o^a$, $R_o^b$ or $R_o^c$, especially the 2,2,2-trichlorethyl radical, the 2-iodethyl radical or the 2-bromethyl radical which can be converted into these, the phenacyl radical or the 4,5-dimethoxy-2-nitrobenzyl radical.

An organic radical $R_3^A$ can also represent a radical $R_o^f$ which together with the —C(=O)—O— grouping forms an esterified carboxyl group which can be split under weakly basic conditions, for example at pH 7–9. Such a radical $R_o^f$ is preferably a radical which together with the —C(=O)—O— grouping forms an activated ester grouping, especially a hydrocarbon radical, particularly an aliphatic or aromatic hydrocarbon radical, which is substituted by electron-attracting groups. Electron-attracting groups are primarily nitro groups, as well as functionally modified carboxyl or sulpho groups, such as cyano or sulphamoyl groups, and also halogen atoms, for example chlorine atoms; these preferably substitute the α-position of the hydrocarbon radical or are conjugated therewith via, preferably aromatic, double bonds. Preferred radicals $R_o^f$ are nitrophenyl radicals, for example 4-nitrophenyl or 2,4-dinitrophenyl radicals, or polyhalogenophenyl radicals, for example 2,4,6-trichlorophenyl or 2,3,4,5,6-pentachlorophenyl radicals, and also cyanomethyl radicals.

An organic group $R_3^A$ can also represent a radical $R_o^g$ which together with the carboxyl grouping —C(=O)—O— forms an esterified carboxyl grouping which can be split under physiological conditions, and can primarily denote a methyl radical substituted by an acyloxy group, wherein the acyl radical, for example like the radical Ac, denotes the acyl radical of an organic carboxylic acid or of a carbonic acid half-derivative, especially a lower alkanoyl radical, for example an acetyl radical.

In the above reaction sequence, the reaction of a compound of formula I with a diformylacrylic acid $R_3^A$-ester of formula VIII is carried out in a manner which is in itself known, for example by heating the reaction mixture to temperatures at which a decomposition of the olefine of formula VII, which can also be employed in the hydrated form, that is to say as the 3,3-diformyl-lactic acid $R_3^A$—ester of formula

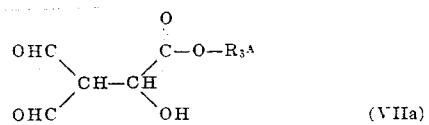

(VIIa)

and loses water under the reaction conditions, is largely avoided, that is to say at about 50°C to about 120°C, usually in the presence of a solvent, such as a suitable, optionally halogenated, aliphatic or aromatic hydrocarbon, for example n-octane or xylene, or of a suitable ether, for example 1,2-dimethoxyethane, and/or in a inert gas atmosphere, such as a nitrogen atmosphere, and/or under elevated pressure.

Acid agents which effect the ring opening of the 5-membered ring and the ring closure to give the 6-membered sulphur-nitrogen ring in a compound of formula VIII are primarily inorganic or strong organic. oxygen-containing acids, as well as aprotic Lewis acids of the boron trifluoride type and thier complexes. Inorganic oxygen-containing acids are, for example, sulphuric acid, phosphoric acid or perchloric acid, whilst strong organic oxygen-containing acids are strong organic carboxylic acids, such as substituted lower alkane-carboxylic acids, for example halogen-lower alkanecarboxylic acids, and above all trifluoracetic acid, or strong organic sulphonic acids, such as p-toluenesulphonic acid. Aprotic Lewis acids of the boron trifluoride type are for example boron trifluoride itself, as well as its complexes, for example with ether, that is to say boron trifluoride etherate, or with hydrofluoric acid, that is to say fluoboric acid, as well as tin tetrachloride. Suitable mixtures of acids can also be used.

The above ring opening and ring closing reaction is carried out in the absence or presence of suitable solvents, (it being possible for certain acid agents, such as tri-fluoracetic acid, simultaneously to serve as solvents), with cooling, at room temperature or with warming, if necessary in a nitrogen atmosphere and/or in a closed vessel.

Here, an acyl radical Ac' which can easily be split off under acid conditions, for example the tert.-butoxycarbonyl radical, is usually also split off under the reaction conditions.

In contrast to the known 2-$R_1$-4-thia-2,6-diaza-bicyclo[3.2.0]heptan-7-one compounds, of which the carbon atom in the 4-position is disubstituted, for example by lower alkyl groups, especially methyl groups, which can also be used in the above reaction sequence for the manufacture of compounds of formula IX, the compounds of formula I, wherein $R_2$ represents the isopropyl group, can be manufactured in a simple manner from the easily accessible starting substances of the 6-N-acylamino-penicillanic acid series, whereby synthetic access to compounds of the 7-N-acylamino-cephalosporanic acid type is significantly simplified.

The compounds of formula I can also be used as starting substances for the manufacture of new compounds possessing antibiotic effects against gram-positive and gram-negative bacteria, and in particular as follows:

If a compound of formula I, wherein $R_1$ represents hydrogen, is oxidised with an oxidising agent for oxidising a mercaptan to a disulphide, then, optionally after treatment with water, a disulphide compound of formula

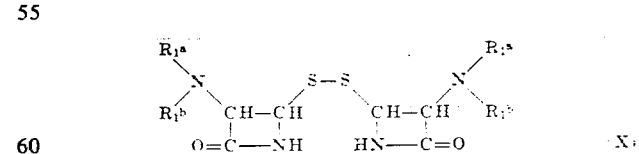

wherein $R_1^a$ and $R_1^b$ represent hydrogen or together represent a $R_2$-methylene group, or an acid addition salt thereof, is obtained. In a compound of formula X, the amino group is acylated, for example in accordance with the acylating process described above, and an $R_2$-methylene group formed by the radicals $R_1^a$ and $R_1^b$, optionally in a modified form, is split simultaneously or subsequently. A compound of formula X thus obtainable, wherein $R_1{}^a$ represents an acyl radical Ac and $R_1{}^b$ represents hydrogen, is reacted with ethylene oxide, with simultaneous treatment with a reducing agent, and a compound of formula

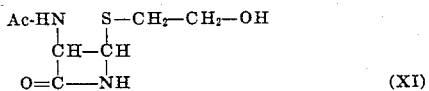  (XI)

is thus obtained, wherein the primary hydroxyl group is converted into a hydroxyl group esterified by the acyl radical of formula $-C(=O)-X_2$. Herein, $X_2$ represents an etherified hydroxyl or mercapto group, which together with the carbonyl grouping forms an esterified carboxyl group which can be split under mild conditions.

The compound of formula

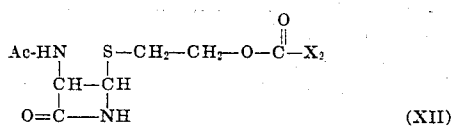  (XII)

thus obtainable is reacted with a compound of formula

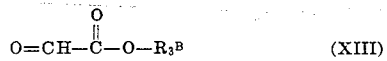  (XIII)

wherein $R_3{}^B$ represents an organic radical of an alcohol which is preferably easily replaceable by hydrogen, or with a reactive derivative thereof. In the addition compound of formula

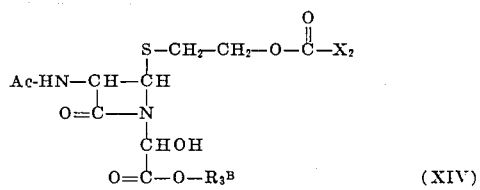  (XIV)

the secondary hydroxyl group is converted into a reactive esterified hydroxyl group. The reactive ester of formula

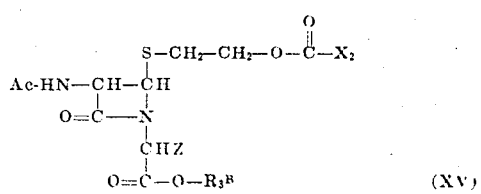  (XV)

wherein Z represents a reactive esterified hydroxyl group, primarily a halogen atom, especially a chlorine or bromine atom, as well as an organic sulphonyloxy group, for example a 4-methylphenylsulphonyloxy or methylsulphonyloxy group, is reacted with a phosphine compound of formula

  (XIV)

wherein each of the radicals $R_a$, $R_b$ and $R_C$ represents an optionally substituted hydrocarbon radical, and in this way, is necessary after splitting off the elements of an acid of formula H-Z (XVIIb) from a phosphonium salt compound of formula

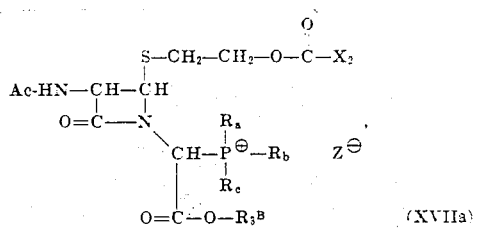  (XVIIa)

obtainable as an intermediate product, the phosphoranylidene compound of formula

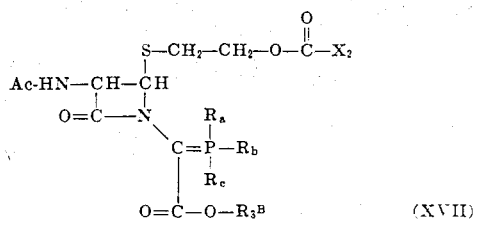  (XVII)

is obtained, in which the esterified carboxyl grouping $-C(=O)-X_2$ is split. If, in a compound of formula

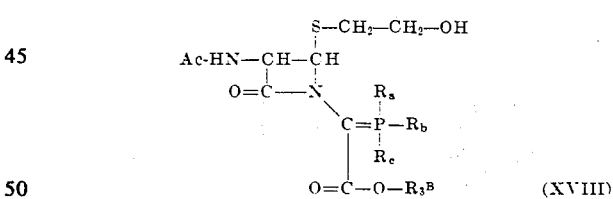  (XVIII)

the carbinol group of fomrula $-CH_2-OH$ is oxidised to a formyl group of formula $-CHO$, there are obtained, with simultaneous ring closure of an aldehyde compound of formula

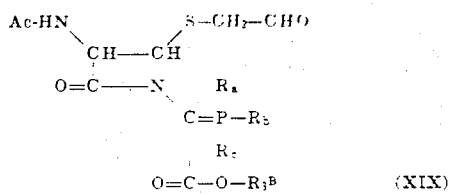  (XIX)

formed as an intermediate product, the ceph-3-em compounds of formula

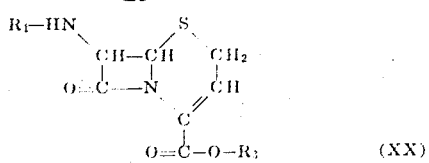

(XX)

wherein $R_1$ represents an acyl radical Ac and $R_3$ represents the organic radical $R_3^B$ of an alcohol, and, if desired, the acyl group Ac can be split off and, in a compound thus obtainable, the free amino group can optionally be acylated and/or an ester grouping of formula $-C(=O)-O-R_3^B$ can be converted into the free carboxyl group or into a different ester grouping of formula $-C(=O)-O-R_3$, and a free carboxyl group can optionally be converted into an esterified carboxyl group of formula $-C(=O)-O-R_3$, and/or a resulting compound having a salt-forming group can be converted into a salt or a resulting salt into the free compound or into a different salt and/or a resulting isomer mixture can be separated into the individial isomers.

The compounds of fomrula XX possess valuable pharmacological properties or can be used as intermediate products for the manufacture of such. Compounds of formula XX, wherein $R_1$ represents an acyl radical occurring in pharmaco-logically active N-acyl derivatives of 6-amino-penam-3-carboxylic acid compounds or 7-amino-ceph-3-em-4carboxylic acid compounds and $R_3$ denotes hydrogen or an organic radical of an alcohol $R_o^a$ which can easily be split off under physiological conditions, are active against microorganisms, such as gram-positive bacteria, for example Staphylococcus aureus, and especially also against penicillin-resistant bacteria of this type, for example at dilutions of up to 0.0001 γ/ml, and against gram-negative bacteria, for example Escherichia coli.

An acyl radical contains in pharmacologically active N-acyl derivatives of 6-amino-penicillanic acid or 7-aminocephalosporanic acid is primarily the 2,6-dimethoxybenzoyl, tetrahydronaphthoyl, 2-methoxy-naphthoyl, 2-ethoxy-naphthoyl, cyclopentylcarbonyl, α-amino-cyclopentylcarbonyl or α-aminocyclohexyl-carbonyl (optionally having a substituted amino group, for example a sulphoamino group optionally present in the salt form), benzyloxycarbonyl, hexahydrobenzyloxycarbonyl, 2-phenyl-5-methyl-4-isoxazolylcarbonyl, 2-(2-chlorophenyl)-5-methyl-4-isoxazolylcarbonyl, 2-(2,6-dichlorophenyl)-5-methyl-4-isoxazolylcarbonyl, phenylacetyl, phenacylcarbonyl, phenyloxyacetyl, phenylthioacetyl, bromophenylthioacetyl, 2-phenyloxypropionyl, α-phenyloxy-phenylacety), α-methoxy-phenylacetyl, α-ethoxy-phenylacetyl, α-methoxy-3,4-dichlorophenylacetyl, α-cyano-phenylacetyl, phenylglycyl (optionally having a substituted amino group, such as a sulphoamino group optionally present in the salt form), benzylthioacetyl, benzylthiopropionyl, α-carboxyphenylacetyl (optionally with a functionally modified carboxyl group, for example a carboxyl group present in the salt form), 2-pyridylacetyl, 4-amino-pyridiniumacetyl, 2-thienylacetyl, α-carboxy-2-thienylacetyl or α-carboxy-3-thienylacetyl (optionally with a functionally modified carboxyl group, for example a carboxyl group present in the salt form), α-cyano-2-thienylacetyl, α-amino-2-thienylacetyl or α-amino-3-thienylacetyl (optionally with a substituted amino group, for example a sulphoamino group optionally present in the salt form), 3-thienylacetyl, 2-furylacetyl, 1-imidazolylacetyl, 1-methyl-5-tetrazolylacetyl, 3-methyl-2-imidazolythioacetyl, 1,2,4-triazol-3-yl-thioacetyl, propionyl, butyryl, hexanoyl, octanoyl, acrylyl, crotonoyl, 3-butenoyl, 2-pentenoyl, methoxyacetyl, methylthioacetyl, butylthioacetyl, allylthioacetyl, chloroacetyl, bromacetyl, dibromacetyl, 3-chloropropionyl, 3-bromopropionyl, aminoacetyl, 5-amino-5-carboxy-valeryl (optionally with a substituted amino group and/or optionally functionally modified carboxyl group), azidoacetyl, carboxyacetyl, methoxycarbonylacetyl, ethoxycarbonylacetyl, bismethoxycarbonylacetyl, N-phenylcarbamoylacetyl, cyanacetyl, α-cyanopropionyl, 2-cyano-3-dimethylacrylyl or N-2-chloroethylcarbamoyl radical.

Compounds of formula XX, wherein both radicals $R_1$ and $R_3$ represent hydrogen, or wherein $R_1$ represents hydrogen or an acyl radical Ac and $R_3$ represents an organic radical of an alcohol $R_3^b$, which together with the $-C(=O)-O-$ grouping forms an esterified carboxyl group which can preferably be split easily, are valuable intermediate products, which can be converted in a simple manner, for example as described below, into the abovementioned pharmacologically active compounds.

The oxidation of compounds of formula I can be effected with the aid of oxidising agents usually employed for the manufacture of disulphide compounds, such as oxygen or hydrogen peroxide (preferably in the presence of heavey metal salts, such as copper-II salts or iron-III salts, for example halides or sulphates, as catalysts), halogens, especially iodine, hypohalites, such as alkali metal hypohalites, iron-III chloride, or heavy metal acylates, such as lead acylates, for example lead tetraacetate, usually in the presence of a suitable diluent, such as benzene, ethanol, acetone or acetic acid, and optionally in the presence of water.

Usually, the disulphide obtained is acylated in the crude state, for example according to the acylation process described above, such as by treatment with an acid or a derivative thereof, such as an acid halide, for example an acid chloride, optionally stepwise and/or in the presence of a suitable condensation agent or basic agent.

Possible reducing agents which are employed simultaneously during the treatment of a disulphide compound of formula X with ethylene oxide, are for example the above-mentioned chemical reducing agents, the reaction being carried out in a neutral or weakly acid medium. Zinc, which is used in the presence of aqueous acetic acid, is particularly suitable as a reducing agent.

In a compound of formula XI, the primary hydroxyl group is converted in a manner which is in itself known, by acylation, into the acyloxy group of formula $-O-C(=O)-X_2$, especially into one of the groups of formulae $-O-C(=O)-O-R_o^a$, $-O-C(=O)-O-R_o^b$, $-O-C(=O)-O-R_o^c$, $-O-C(=O)-O-R_o^d$, $-O-C(=O)-O-R_o^e$ or $-O-C(=O)-O-R_o^f$, wherein $R_o^a$, $R_o^b$, $R_o^c$, $R_o^d$, $R_o^e$ and $R_o^f$ have the abovementioned meanings, and primarily represent the 2,2,2-trichlorethyl, 2-bromethyl, 2-iodethyl, phenacyl, 4,5-dimethoxy-2-nitro-benzyl, 4-methoxy-benzyl or tert.-butyl radical.

In the above acylation reaction, the customary acylating agents can be employed, especially suitable reactive derivatives of acids, where necessary in the presence of a preferably basic agent, such as an organic tertiary base, for example triethylamine or pyridine. Reactive derivatives of acids are, for example, anhydrides, including internal anhydrides, such as ketenes, or isocyanates, or mixed anhydrides, especially anhydrides which can be prepared with halogenoformic acid esters, for example chloroformic acid ethyl ester, or halogenacetic acid halides, for example trichloracetic acid chloride, and also halides, primarily chlorides, or reactive esters, such as esters of acids with alcohols or phenols containing electron-attracting groupings, as well as esters with N-hydroxy compounds, for example cyanomethanol. 4-nitrophenol or N-hydroxysuccinimide. At the same time, the acyl group can also be introduced stepwise; thus it is for example possible to treat a compound of formula XI with a carbonic acid dihalide, for example phosgene, and to convert the compound thus obtainable, of formula XII, wherein $X_2$ represents a halogen atom, for example a chlorine atom, into the desired compound of formula XII by means of a suitable alcohol, for example 2,2,2trichlorethanol, tert.-butanol or phenacylalcohol. The acylation reaction can be carried out in the presence or absence of solvents or solvent mixtures, if necessary with cooling or warming, in a closed vessel under pressure and/or in an inert gas atmosphere, for example a nitrogen atmosphere, and can optionally be carried out stepwise.

In a compound of formula XIII, a radical $R_3^B$ primarily represents one of the groups $R_o^a$, $R_o^b$, $R_o^c$, $R_o^d$, $R_o^e$, $R_o^f$ or $R_o^g$, such as the abovementioned groups of this nature, and especially represents the 2,2,2-trichlorethyl, 2-iodethyl (or 2-bromethyl convertible thereto), phenacyl, 4,5-dimethoxy-2-nitro-benzyl, 4-methoxybenzyl or tert.-butyl radical.

The addition of the glyoxylic acid ester compound of formula XIII to the nitrogen atom of the lactam ring of a compound of formula XII preferably takes place at elevated temperature, primarily at about 50°C to about 150°C, and in particular in the absence of a condensation agent and/or without the formation of a salt. Here is it possible, instead of using the free glyoxylic acid ester compound to use a reactive oxo derivative thereof, primarily a hydrate, and when using the hydrate water produced can, if necessary, be removed by distillation, for example azeotropically.

Preferably, the process is carried out in the presence of a suitable solvent, such as for example dioxane or toluene, or solvent mixture, if desired or necessary in a closed vessel under pressure and/or in the atmosphere of an inert gas, such as nitrogen.

In a compound of formula XIV, the secondary hydroxyl group can be converted in a manner which is in itself known into a reactive hydroxyl group esterified by a strong acid, especially into a halogen atom or into an organic sulphonyloxy group. In doing so, suitable halogenating agents are for example used, such as a thionyl halide, for example thionyl chloride, a phosphorus oxyhalide, especially phosphorus oxychloride, or a halogenophosphonium halide, such as triphenylphosphonium dibromide or diiodide, or a suitable organic sulphonic acid halide, such as sulphonic acid chloride, the reaction preferably being carried out in the presence of a basic agent, primarily an organic basic agent, such as an aliphatic tertiary amine, for example triethylamine or diisopropylethylamine, or of a heterocyclic base of the pyridine type, for example pyridine or collidone. Preferably, the process is carried out in the presence of a suitable solvent, for example dioxane or tetrahydrofurane, or of a solvent mixture, if necessary with cooling and/or in the atmosphere of an inert gas, such as nitrogen.

In a resulting compound of formula XV, a reactive esterified hydroxyl group Z can be converted into another reactive esterified hydroxyl group in a manner which is in itself known. Thus, it is for example possible to replace a chlorine atom by a bromine or iodine atom by treating the appropriate chlorine compound with a suitable bromine or iodine reagent, especially with an inorganic bromide or iodide salt, such as lithium bromide, preferably in the presence of a suitable solvent, such as ether.

In a phosphine compound of formula XVI, each of the groups $R_a$, $R_b$ and $R_c$ primarily denote a lower alkyl radical which is optionally substituted, for example by etherified or esterified hydroxyl groups, such as lower alkoxy groups or halogen atoms, or a phenyl radical which is optionally substituted, for example by aliphatic hydrocarbon radicals, such as lower alkyl groups, or etherified or esterified hydroxyl groups, such as lower alkoxy groups or halogen atoms, or nitro groups.

The reaction of a compound of formula XV with the phosphine compound of formula XVI, wherein each of the groups $R_a$, $R_b$ and $R_c$ primarily represent a phenyl radical, as well as a lower alkyl radical, especially the n-butyl radical, is preferably carried out in the presence of a suitable inert solvent, such as an aliphatic, cycloaliphatic or aromatic hydrocarbon, for example hexane, cyclohexane, benzene or toluene, or of an ether, for example dioxane, tetrahydrofurane or diethylene glycol-dimethyl ether, or of a solvent mixture. If necessary, the process is carried out with cooling, or at an elevated temperature and/or in the atmosphere of an inert gas, such as nitrogen.

A phosphonium salt compound of formula XVII$a$ formed as an intermediate usually spontaneously loses the elements of the acid of formula H-Z (XVII$b$); if necessary, the phosphonium salt compound can be decomposed by treatment with a weak base, such as an organic base, for example diisopropylethylamine or pyridine, and be converted into the phosphoranylidene compound of formula XVII.

The splitting of the esterified carboxyl group of formula $-C(=O)-X_2$ in a compound of formula XVII can be carried out in various ways, depending on the nature of the group $X_2$. Thus, it is possible to split a grouping of formula $-C(=O)-X_2$. wherein $X_2$ represents the group of formula $-O-R_o^a$ or $-O-R_o^b$ by treatment with a chemical reducing agent, a grouping of formula $-C(=O)-X_2$, wherein $X_2$ represents the group of formula $-O-R_o^c$, by irradiation, and a grouping of formula $-C(=O)-X_2$, wherein $X_2$ represents the group of formula $-O-R_o^d$, by treatment with an acid. These reactions can for example be carried out as described above, and the process can also be carried out in the absence of water. An esterified carboxyl grouping of formula $-C(=O)-O-R_o^e$ can also, like the grouping of formula $-C(=O)-O-R_o^d$, be split by treatment with an acid, for example trifluoroacetic acid. An esterified carboxyl grouping of formula $-C(=O)-O-R_o^f$ can be split under weakly basic conditions, for example at a pH value of about 7 to about 9, for example by treatment with a weakly basic agent, such as an alkali metal hydrogen carbonate, for example sodium hydrogen carbonate, or a suitable buffer solution (pH about 7 to about 9), such as a dipotassium hydrogen phosphate buffer, preferably in the presence of water and of an organic solvent, such as methanol or acetone.

At the same time, the esterified carboxy groups of formulae $—C(=O)—X_2$ and $—C(=O)—O—R_3^B$ in a compound of formula XVII preferably differ from one another in such a way that under the conditions of splitting of the esterified carboxyl group of formula $—C(=O)—X_2$ the esterified carboxyl group of formula $—C(=O)—O—R_3^B$ remains intact. If, for example, the esterified carboxyl group of formula $—C(=O)—X_2$ represents an esterified carboxyl group which can be split on treatment with a chemical reducing agent, such as zinc in the presence of aqueous acetic acid, for example a grouping of formula $—C(=O)—O—R_o^a$ or $—C(=O)—O—R_o^b$, wherein $R_o^a$ preferably represents the 2,2,2-trichlorethyl radical or 2-iodethyl radical, or of the 2-bromethyl radical which can easily be converted into the latter, and $R_o^b$ primarily represents the phenacyl group, then the esterified carboxyl group of formula $—C(=O)—O—R_3^B$ for example represents one of the esterified carboxyl groups $—C(=O)—O—R_3^B$ which can be split on treatment with a suitable acid, such as trifluoroacetic acid, for example represents a grouping of formula $—C(=O)—O—R_o^e$, wherein $R_o^e$ preferably represents the tert.-butyl group.

The oxidation of a primary carbinol group to a formyl group in a compound of formula XVIII can surprisingly be effected by treatment with an oxidising organic sulphoxide compound in the presence of agents having dehydrating or water-absoring properties. Possible oxidising sulphoxide compounds are primarily aliphatic sulphoxide compounds, such ad di-lower alkylsulphoxides, primarily dimethylsulphoxde, or lower alkylenesulphoxides, for example tetramethylenesulphoxide. As agents with dehydrating or water-absorbing properties, acid anhydrides should primarily be mentioned, especially anhydrides of organic carboxylic acids, such as aliphatic or aromatic carboxylic acids, for example anhydrides of lower alkanecarboxylic acids, especially acetic anhydride, and also propionic anhydride, or benzoic anhydride, as well as anhydrides of inorganic acids, especially of phosphoric acids, such as phosphorus pentoxide. The above anhydrides, primarily of organic carboxylic acids, for example acetic anhydride, are preferably used in an approximately 1:1 mixture with the sulphoxide oxidising agent. Further dehydrating or water-absorbing agents are carbodiimides, primarily dicyclohexylcarbodiimide, and also diisopropylcarbodiimide, or ketenimines, for example diphenyl-N-p-tolylketenimine; these reagents are preferably used in the presence of acid catalysts, such as phosphoric acid or pyridinium trifluoroacetate or pyridinium phosphate. Sulphur trioxide can also be used as a dehydrating or water-absorbing agent, and is customarily employed in the form of a complex, for example with pyridine.

Usually, the sulphoxide oxidising agent is used in excess. Sulphoxide compounds which are liquid under the reaction conditions, especially dimethylsulphoxide, can for example simultaneously serve as solvents; additionally, inert diluents, such as benzene, or mixtures of solvents can be used as solvents.

The above oxidation reaction is, if desired, carried out with cooling, but in most cases at room temperature or slightly elevated temperature.

In a compound of formula XX, an acyl group Ac, especially an easily removable acyl group, can be removed in a manner which is in itself known, a tert.-butoxycarbonyl group for example by treatment with trifluoracetic acid, and a 2,2,2-trichlorethoxycarbonyl group by treatment with a suitable metal or a metal compound, for example zinc, or with a chromium-II compound, such as chromium-II chloride or acetate, advantageously in the presence of a hydrogen-releasing agent which together with the metal or the metal compound generates nascent hydrogen, preferably aqueous acetic acid. Furthermore it is possible, in a compound of formula XX, wherein a carboxyl group of formula $—C(=O)—O—R_3$ preferably represents a carboxyl group which is protected, for example by esterification, including by silylation or stannylation, for example with a suitable organic halogeno-silicium compound or halogen-tin-IV compound, such as trimethylchlorosilane, to split off a suitable acyl group Ac, wherein free functional groups which may be present are preferably protected, by treatment with an imide-halide-forming agent, such as a suitable inorganic acid halide, for example phosphorus pentachloride, preferably in the presence of a basic agent, such as pyridine, reaction of the resulting imide-halide with an alcohol, such as a lower alkanol, for example methanol, and splitting off the resulting imino-ether in an aqueous or alcoholic medium, preferably under acid conditions.

In a compound of formula XX thus obtained, the unsubstituted amino group can be acylated according to methods of acylation which are in themselves known, for example as described above, and an acyl group can also be introduced stepwise. Thus, it is possible to introduce a halogen-lower alkanoyl group, for example a bromacetyl group, into the free amino group of a compound of formula XX, and to react a N-halogen-lower alkanoylamino compound thus obtainable with suitable exchange reagents, such as basic compounds, for example tetrazole, thio compounds, for example 2-mercapto-1-methylimidazole, or metal salts, for example sodium azide; substituted N-lower-alkanoylamino compounds are thus obtained.

In a compound of formula XX having an esterified carboxyl group, the latter for example representing a carboxyl group of formula $—C(=O)—O—R_3^B$ which can easily be converted into the free carboxyl group, this esterified carboxyl group can be converted into the free carboxyl group in a manner which is in itself known, for example depending on the nature of the esterifying radical $R_3^B$, a grouping of formula $—C(=O)—O—R_o^a$ or $—C(=O)—O—R_o^b$ for example by treatment with a chemical reducing agent, such as a metal, for example zinc, or a reducing metal salt, such as a chromium-II salt, for example chromium-II chloride, usually in the presence of a hydrogen-releasing agent which together with the metal is capable of generating nascent hydrogen, such as an acid, primarily acetic acid, or an alcohol, water being preferably added, a grouping of formula $—C(=O)—O—R_o^c$ for example by irradiation, preferably with ultraviolet light, using ultraviolet light of shorter wavelengths, for example below 290 m$\mu$, if $R_o^c$ for example represents an arylmethyl radical which is optionally substituted in the 3-, 4- and/or 5-position, for example by lower alkoxy groups and/or nitro groups, or ultraviolet light of longer wavelengths, for example above 290 mμ, if $R_o^c$ for example denotes an arylmethyl radical substituted in the 2-position by a nitro group, a grouping of formula $-C(=O)-O-R_o^a$ or $-C(=O)-O-R_o^e$ for example by treatment with an acid agent, such as formic acid or trifluoracetic acid, and a grouping of formula $-C(=O)-O-R_o^f$ for example by treatment with a weakly basic agent, such as aqueous sodium hydrogen carbonate, or an aqueous potassium phosphate buffer of pH about 7 to about 9.

In a compound of formula XX, a grouping of formula $-C(=O)-O-R_3^B$ can be converted into another grouping of this formula, for example a 2-bromethoxycarbonyl group $-C(=O)-O-R_o^a$ can be converted into a 2-iodethoxycarbonyl group by treatment with an iodine salt, such as sodium iodide, in the presence of a suitable solvent, such as acetone.

A carboxyl group which is protected, for example by silylation, can be liberated in the customary manner, for example by treatment with water or with an alcohol.

In a compound of formula XX having a group of formula $-C(=O)-O-R_3$, wherein $R_3$ represents hydrogen, the free carboxyl group can be esterified in a manner which is in itself known, for example by treatment with a diazo compound, such as a diazo-lower alkane, for example diazomethane or diazoethane, or a phenyldiazo-lower alkane, for example phenyldiazomethane or diphenyldiazomethane, or by reaction with an alcohol suitable for esterification, in the presence of an esterifying agent, such as a carbodiimide, for example dicyclohexylcarbodiimide, as well as carbonyldiimidazole, or according to any other known and suitable esterification process, such as reaction of a salt of the acid with a reactive ester of an alcohol and of a strong inorganic acid as well as of a strong organic sulphonic acid. It is furthermore possible to convert acid halides, such as acid chlorides (for example manufactured by treatment with oxalyl chloride), or activated esters, for example those with N-hydroxy-nitrogen compounds, or mixed anhydrides formed, for example, with halogenoformic acid lower alkyl esters, such as chloroformic acid ethyl ester, or with halogenacetic acid halides, such as trichloracetic acid chloride, into esters by treatment with alcohols, optionally in the presence of a base, such as pyridine.

Salts are especially those of compounds of formula XX, in which $R_3$ represents hydrogen, and primarily metal salts or ammonium salts, especially appropriate pharmaceutically usable, non-toxic salts, such as alkali metal salts and alkaline earth metal salts, for example sodium, potassium, magnesium or calcium salts, as well as ammonium salts with ammonia or suitable organic amines, it being possible primarily to use aliphatic, cycloaliphatic, cycloaliphatic-aliphatic and aliphatic primary, secondary or tertiary monoamines, diamines or polyamines for the salt formation, such as lower alkylamines, for example triethylamine, hydroxy-lower alkylamines, for example 2-hydroxyethylamine, bis-(2-hydroxyethyl)-amine or tri-(2-hydroxyethyl)-amine, basic aliphatic esters of carboxylic acids, for example 4-aminobenzoic acid 2-diethylamino-ethyl ester, alkyleneamines, for example 1-ethylpiperidine, cycloalkylamines, for example bicyclohexylamine, or benzylamines, for example N,N'-dibenzylethylenediamine. Compounds of formula XX, in which, for example, $R_1$ represents hydrogen, or which possess a basic group in an acyl radical $R_1$, can also form acid addition salts, especially pharmaceutically usable, non-toxic acid addition salts, for example with inorganic acids, such as hydrochloric acid, sulphuric acid or phosphoric acid, or with suitable organic carboxylic acids or sulphonic acids. Compounds of formula XX, wherein $R_3$ represents hydrogen, and in which $R_1$ represents hydrogen or which contain a basic group in an acyl radical $R_1$, can also be present in the form of an inner salt, that is to say in a zwitter-ion form.

Salts of compounds of formula XX can be manufactured in a manner which is in itself known. Thus, it is possible to form salts of compounds of formula XX, wherein $R_3$ represents hydrogen, for example by treatment with metal compounds, such as alkali metal salts of suitable carboxylic acids, for example the sodium salt of α-ethyl-caproic acid, or with ammonia or a suitable organic amine, stoichiometric amounts, or only a slight excess, of the salt-forming agent being used preferably. Acid addition salts are obtained in the usual manner, for example by treatment with an acid or a suitable anion exchange reagent. Salts can be converted into the free compounds in the usual manner, metal salts and ammonium salts for example by treatment with suitable acids, and acid addition salts for example by treatment with a suitable basic agent.

The compounds of formula XX having pharmacological effects can for example be used in the form of pharmaceutical preparations in which they are present mixed with a solid or liquid pharmaceutical excipient, and which are suitable for enteral, parenteral or topical administration. Suitable carriers which are inert towards the active substances are, for example, water, gelatine, saccharides, such as lactose, glucose or sucrose, starches, such as corn starch, wheat starch or arrowroot, stearic acid or salts thereof, such as magnesium stearate or calcium stearate, talc, vegetable fats and oils, alginic acid, benzyl alcohols, glycols or other known excipients. The preparations can be in a solid form, for example as tablets, dragees, capsules or suppositories, or in a liquid form, for example as solutions, suspensions or emulsions. They can be sterilised and/or contain auxiliary substances, such as preservatives, stabilisers, wetting agents or emulsifiers, solubilising agents, salts for regulating the osmotic pressure and/or buffers. Furthermore they can contain other pharmacologically usable substances. The pharmaceutical preparations which are also encompassed by the present invention, can be formulated in a manner which is in itself known.

The invention is described in the examples which follow.

EXAMPLE 1:

A cold solution of 0.3 g of 2,2-dimethyl-3,6-bis-(N-2,2,2-trichlorethoxycarbonyl-amino)-penam in a mixture of 9 ml of acetic acid and 1 ml of water is treated with 1.5 g of zinc dust, whilst stirring. The reaction mixture is stirred for 30 minutes at room temperature and filtered, and the filter residue is washed with a 9:1 mixture of acetic acid and water. The filtrate is frozen in liquid nitrogen and lyophilised under a pressure of 0.01 mm Hg. The residue is suspended in methylene chloride and shaken with aqueous sodium hydrogen carbonate solution until the pH value remains at 8-9. The aqueous phase is repeatedly extracted with methylene chloride and the organic extract solutions are evapoated. The residue is recrystallised from a mixture of methylene chloride and hexane, and 3-isopropyl-4-thia-2,6-diazabicyclo [3.2.0]heptan-7-one of formula

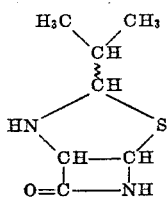

is thus obtained, melting at 151°–155°C (156°–157°C, corrected); $[\alpha]_D{}^{20} = -130° \pm 1°$ ($c$ = in acetonitrile); thin layer chromatogram (silica gel): Rf = 0.17 (system toluene/acetone, 8:2) and Rf = 0.38 (system toluene/acetone, 6:4); infrared absorption spectrum (in methylene chloride): characteristic bands at 2.98µ, 3.32µ, 3.40µ, 5.65µ, 7.07µ, 8.90µ, 10.51µ and 11.17µ.

The starting material can be manufactured as follows:

A suspension of 1.25 g of 6-amino-2,2-dimethylpenam-3-carboxylic acid in 10 ml of chloroform (freshly distilled over phosphorus pentoxide) is treated with 2.5 ml of hexamethyldisilazane and 2.5 ml of chloroform (dried over phosphorus pentoxide). The mixture is boiled under reflux until a clear solution is formed (about 4 hours) and the volatile constituents are removed under a pressure of 0.1 mm Hg at room temperature. The crystalline trimethylsilyl ester of 6-amino-2,2-dimethyl-penam-3-carboxylic acid is dissolved in 15 ml of a 1:1 mixture of dioxane and ether, the solution is cooled, and 3.37 g of chloroformic acid 2,2,2-trichlorethyl ester are added. The mixture is stirred for 16 hours at room temperature and is then diluted with ether and twice extracted with 50 ml portions of a cold, half-saturated aqueous sodium hydrogen carbonate solution. The combined aqueous solutions are treated with 80 ml of methylene chloride and the pH value is adjusted to 3 by adding citric acid at 0°C. After separating off the organic solution, the aqueous mixture is washed with methylene chloride, and the combined organic solutions are evaporated. 2,2-Dimethyl-6-(N-2,2,2-trichlorethoxycarbonyl-amino)-penam-3-carboxylic acid is thus obtained in an amorphous form; infrared absorption spectrum (in methylene chloride): characteristic bands at 2.95µ, 5.60µ, 5.74µ, 6.62µ, 8.22µ, 8.42µ and 8.92µ.

A solution of 2.26 g of 2,2-dimethyl-6-(N-2,2,2-trichlorethoxycarbonyl-amino)-penam-3-carboxylic acid (crude form) in 60 ml of anhydrous tetrahydrofurane is treated with 4.3 ml of a solution of 2 ml of triethylamine diluted to a volume of 10 ml with tetrahydrofurane. After cooling to −10°C, 3.2 ml of a solution of 2 ml of chloroformic acid 2,2,2-trichlorethyl ester, diluted with tetrahydrofurane to a volume of 10 ml, are added, and the reaction mixture is stirred for 90 minutes at −5°C to −10°C, and is then treated with 0.534 g of sodium azide in 5.24 ml of water. The mixture is stirred for a further 30 minutes at 0°C, then diluted with 300 ml of ice water, and extracted three times with 100 ml portions of methylene chloride. The organic extracts are washed with water, dried and evaporated at room temperature. 2,2-Dimethyl-6-(N-2,2,2-trichlorethoxycarbonyl-amino)-penam-3-carboxylic acid azide is thus obtained in an amorphous form; infrared absorption spectrum (in methylene chloride): characteristic bands at 2.96µ, 4.41µ, 5.59µ, 5.74µ, 5.84µ, 6.62µ, 8.24µ, 8.54µ and 9.05µ.

A mixture of 1.95 g of 2,2-dimethyl-6-(N-2,2,2-trichlorethoxycarbonyl-amino)-penam-3-carboxylic acid azide (crude form) in 50 ml of dry benzene is heated for 30 minutes at 70°C and is then treated with 3.37 ml of 2,2,2-trichlorethanol; the mixture is heated at 70°C for 17 hours and evaporated under reduced pressure. The residue is chromatographed on 4 g of silica gel, using a 95:5 mixture of benzene and acetic acid ethyl ester for extraction. A by-product is first eluted, and the amorphous 2,2-dimethyl-3,6-bis-(N-2,2,2-trichlorethoxycarbonyl-amino)-penam is obtained with the subsequent fractions of the same eluting mixture; infrared absorption spectrum (in methylene chloride): characteristic bands at 2.96µ, 5.59µ, 5.76µ, 6.66µ, 8.24µ, 8.47µ, 9.15µ, 9.60µ and 12.24µ.

EXAMPLE 2:

A mixture of 0.05 g of 6-amino-2,2-dimethyl-3-(N-2,2,2-trichlorethoxycarbonyl-amino)-penam and 0.1 g of zinc dust in 2 ml of a 1:1 mixture of acetone and water is treated with 0.2 ml of acetic acid and then vibrated for 1 hour at 20°C with 45 kHz (ultrasonics), and thereafter diluted with 50 ml of water. The mixture is extracted with 50 ml of acetic acid ethyl ester, and the organic extract is dried over sodium sulphate and evaporated under reduced pressure. The residue is recrystallised from a mixture of methylene chloride and hexane, and 3-isopropyl-4-thia-2,6-diazabicyclo[3.2.0-]heptan-7-one is thus obtained, melting point 151°–155°C: thin layer chromatogram: Rf = 0.17 (system: toluene/acetone, 8:2) and Rf = 0.38 (system: toluene/acetone, 6:4).

In the above process, 0.2 g of ammonium chloride or 0.2 g of pyridine hydrochloride can be used instead of the acetic acid.

The starting material can be manufactured as follows:

A suspension of 30 g of the potassium salt of 2,2-dimethyl-6-(N-phenylacetylamino)-penam-3-carboxylic acid in a mixture of 150 ml of anhydrous dimethylformamide and 12 ml of pyridine is treated with 9 ml of trichloracetyl chloride at −15°C under a nitrogen atmosphere, and the whole is stirred for 15 minutes at −15°C. The clear yellow solution is treated with 6.5 g of solid sodium azide and again stirred for 15 minutes at −15°C, and is thereafter poured out, whilst stirring, onto a mixture of 400 ml of toluene and 400 ml of ice water. The phases are separated; the aqueous solution is twice extracted cold with 250 ml portions of toluene. The three organic solutions are twice washed with 250 ml portions of ice water, combined, dried over sodium sulphate and evaporated under reduced pressure. The residue contains 2,2-dimethyl-6-(N-phenylacetyl-amino)-penam-3-carboxylic acid azide; infrared absorption spectrum (in methylene chloride): characteristic bands at 3.02µ, 4.69µ, 5.60µ, 5.93µ, 6.70µ and 8.54µ; thin layer chromatogram (silica gel): Rf =0.49 (system toluene/acetone, 8:2) and Rf =0.69 (system: toluene/acetone, 6:4); this material still contains solvent and on further drying changes into 3-isocyanato-2,2-dimethyl-6-(N-phenylacetyl-amino)-penam.

24.3 g of the 2,2-dimethyl-6-(N-phenylacetyl-amino)-penam-3-carboxylic acid azide obtained as the evaporation residue are dried for 24 hours at 20°C under a high vacuum. 3-Isocyanato-2,2-dimethyl-6-(N-phenylacetyl-amino)-penam is obtained as a light brown foam; infrared spectrum (in methylene chloride): characteristic bands at $3.00\mu$, $4.44\mu$, $5.59\mu$, $5.93\mu$, $6.69\mu$, $7.98\mu$ and $8.35\mu$; thin layer chromatogram (silica gel): Rf = 0.23 (system toluene/acetone, 8:2), and Rf =0.52 (system toluene/acetone, 6:4). 3-Isocyanato-2,2-dimethyl-6-(N-phenylacetyl-amino)-penam is also obtained if a benzene solution of 2,2-dimethyl-6-(N-phenylacetyl-amino)-penam-3-carboxylic acid azide is heated for half an hour to 70°C under a nitrogen atmosphere.

A solution of 19.3 g of 3-isocyanato-2,2-dimethyl-6-(N-phenylacetyl-amino)-penam in 200 ml of benzene is treated with 14.1 ml of 2,2,2-trichlorethanol and the exothermic reaction is started by adding 0.9 ml of triethylamine; at the same time the temperature is kept at 20°C by cooling. The mixture is left to stand for 1 hour at 20°C and one hour at 0°C, and the precipitate is filtered off and washed with 50 ml of a cold 1:1 mixture of benzene and hexane and with hexane (room temperature). The 2,2-dimethyl-6-(N-phenylacetyl-amino)-3-(N-2,2,2-trichlorethoxycarbonyl-amino)-penam thus obtained melts at 200°–202°C (corrected); thin layer chromatogram (silica gel), Rf = 0.35 (system toluene-/acetone, 8:2), and Rf = 0.66 (system toluene/acetone, 6:4).

A solution of 11.0 g of 2,2-dimethyl-6-(N-phenylacetylamino)-3-(N-2,2,2-trichlorethoxycarbonyl-amino)-penam in a mixture of 240 ml of anhydrous methylene chloride and 25.6 ml of pyridine is treated with 166 ml of a 10 percent strength solution of phosphorus pentachloride in methylene chloride at −10°C under a nitrogen atmosphere and the whole is subsequently stirred for 30 minutes at 0°C. 120 ml of absolute methanol are then added with intense cooling (−1-0°C) and the mixture is stirred for a further 2 hours. 80 ml of water are added, the pH value (measured in samples diluted with water) is adjusted to 3.3 with about 9 ml of a 2 N aqueous sodium hydroxide solution, and the mixture is allowed to react for one hour at 0°C and for a further hour at 20°C. It is then poured, with stirring, onto 500 ml of a 1 M aqueous di-potassium hydrogen phosphate buffer solution and the pH value is adjusted from 6.5 to 7.0 by adding 50 percent strength aqueous tripotassium phosphate solution. The aqueous phase is separated off and twice washed with 200 ml portions of methylene chloride; the three organic solutions are each twice washed with water, combined, dried over sodium sulphate and evaporated under reduced pressure. The crystalline residue is taken up in 40 ml of a 1:1 mixture of benzene and hexane; the mixture is cooled for 15 minutes at 0°C and the precipitate is filtered off. 6-Amino-2,2-dimethyl-3-(N-2,2,2-trichlorethoxycarbonyl-amino)-penam is thus obtained, melting at 179°–180°C (corrected); infrared absorption spectrum: characteristic bands in methylene chloride at $2.90\mu$, $5.58\mu$, $6.62\mu$, $7.17\mu$, $7.27\mu$, $8.32\mu$, $8.46\mu$, $8.82\mu$, $9.25\mu$ and $9.62\mu$; and in Nujol at $2.95\mu$, $3.01\mu$, $3.11\mu$, $5.65\mu$, $5.80\mu$, $6.35\mu$, $7.60\mu$, $7.87\mu$, $8.00\mu$, $8.27\mu$, $8.65\mu$, $8.70\mu$, $9.16\mu$ and $9.57\mu$; thin layer chromatogram (silica gel): Rf = 0.17 (in the system toluene/acetone, 8:2) and Rf = 0.43 (in the system toluene/acetone, 6:4); characteristic yellow colour with ninhydrin-collidine (free amino group).

EXAMPLE 3:

A solution of 0.26 g of 6-amino-3-(N-2-iodethyloxy-carbonyl-amino)-2,2-dimethyl-penam in 5 ml of tetrahydrofurane is diluted with 15 ml of 90 percent strength aqueous acetic acid, and the mixture is cooled to 0°C and treated with 2 g of zinc dust whilst stirring vigorously. The reaction mixture is stirred for a further 10 minutes at 0°C and is then filtered through a filter with a layer of a diatomaceous earth preparation. The filter residue is suspended in tetrahydrofurane, again filtered and well rinsed with methylene chloride. The combined filtrates are evaporated under reduced pressure and at low temperature, and to remove the acetic acid the residue is repeatedly evaporated to dryness with toluene under a high vacuum, and is then taken up in 80 ml of methylene chloride and 30 ml of a saturated aqueous sodium chloride solution and well shaken. The organic phase is separated off and washed with 40 ml of an 0.5 molar dipotassium hydrogen phosphate solution saturated with sodium chloride, and with 30 ml of a saturated aqueous sodium chloride solution. The aqueous solutions are further washed twice with 70 ml portions of methylene chloride; the combined organic solutions are dried over magnesium sulphate and evaporated under reduced pressure. 0.085 g of the residue, in methylene chloride, is chromatographed on 5 g of silica gel (containing 7 percent of water; column). 3-Isopropyl-4-thia-2,6-diazabicyclo[3.2.0]heptan-7-one, melting point 151°–155°C after recrystallisation from a mixture of methylene chloride and hexane, is eluted with methylene chloride containing from about 10 to about 20 percent of acetic acid methyl ester. The 4,4-dimethyl-5-thia-2,7-diazabicyclo[4.2.0]oct-2-en-8-one which is also formed, melting point 152°–153°C after crystallisation from a mixture of tetrahydrofurane and diethyl ether, is eluted with methylene chloride containing about 50 percent of acetic acid methyl ester.

The starting material can be manufactured as follows:

The yellow solution of 23 g of crude 3-isocyanato-2,2-dimethyl-6-(N-phenylacetyl-amino)-penam, produced by warming 2,2-dimethyl-6-(N-phenylacetyl-amino)-penam-3-carboxylic acid azide, in 230 ml of benzene is treated with 4.9 ml of 2-bromethanol and 0.1 ml of bis-tri-n-butyl-tin oxide, and left to stand for 2 hours at room temperature and then evaporated. The residue is taken up in methylene chloride and chromatographed on 350 g of silica gel (column). The 3-(N-2-bromethyloxycarbonyl-amino)-2,2-dimethyl-6-(N-phenylacetyl-amino)-penam is eluted with a 9:1 mixture of methylene chloride and acetic acid ethyl ester. After recrystallisation from a mixture of methylene chloride and cyclohexane, or acetone and cyclohexane, the product melts at 149°–150°C; $[\alpha]_D^{20} = +99° = 1°$ (c = 1.008 in chloroform); thin layer chromatogram (silica gel): Rf = 0.51 (system toluene/acetic acid ethyl ester, 1:1), Rf = 0.32 (system toluene/acetone, 4:1) and Rf = 0.71 (system toluene/acetone, 1:1); ultraviolet absorption spectrum (in ethanol):$\lambda_{max}252\mu$ ($\epsilon$ = 300), 258 m$\mu$ ($\epsilon$ = 270) and 265 m$\mu$ ($\epsilon$ =180); infrared absorption spectrum: characteristic bands at $2.91\mu$, $5.58\mu$, $5.77\mu$, $5.94\mu$, $6.62\mu$(shoulder), $6.66\mu$, $8.21\mu$, $8.30\mu$, $8.48\mu$, $9.32\mu$ and $9.64\mu$ (in methylene chloride), and at $2.93\mu$, $2.95\mu$, $3.01\mu$, $5.62\mu$, $5.79\mu$, $5.82\mu$ (shoulder), 5.91µ, 5.98µ, 6.53µ, 6.57µ, 6.68µ and 7.36µ (in mineral oil).

A solution of 6.9 g of sodium iodide in 34.5 ml of purified acetone is poured over 5.265 g of 3-(N-2-bromethyloxycarbonyl-amino)-2,2-dimethyl-6-(N-phenylacetyl-amino)-penam and the whole is allowed to stand for 16 hours at 30°C; a dense precipitate of sodium bromide begins to separate out already after a few minutes. After completion of the reaction, the solvent is evaporated off under reduced pressure and the residue is taken up in 30 ml of water and 70 ml of acetic acid ethyl ester. The golden yellow organic phase is shaken after adding a few drops of 0.1 N aqueous sodium thiosulphate solution; the aqueous phase is separated off and twice washed with 50 ml portions of acetic acid ethyl ester. The combined organic solutions are twice washed with 20 ml portions of water, dried over magnesium sulphate and concentrated to a volume of 20–30 ml. They are diluted with 50 ml of methylene chloride, treated with 200 ml of hot cyclohexane, cooled to room temperature and left to stand for one hour at 4°C. The colourless needles are filtered off and washed with a 4:1 mixture of cyclohexane and ether. 3-(N-2-Iodethoxycarbonyl-amino)-2,2-dimethyl-6-(N-phenylacetyl-amino)-penam is obtained, which after crystallisation from acetic acid methyl ester and cyclohexane melts at 153°–154°C; $[\alpha]_D^{20} = +89° \pm 1°$ ($c = 1.011$ in chloroform); thin layer chromatogram (silica gel): $Rf = 0.56$ (system toluene/acetic acid ethyl ester, 1:1), $Rf = 0.35$ (system toluene/acetone, 4:1) and $Rf = 0.74$ (system toluene/acetone, 1:1); ultraviolet absorption spectrum (in ethanol): $\lambda_{max}$ 252 m$\mu$ ($\epsilon = 815$), 258 m$\mu$ ($\epsilon + 775$), 264 m$\mu$ ($\epsilon = 600$) and 335 m$\mu$ ($\epsilon = 45$); infrared absorption spectrum: characteristic bands at 2.90µ, 5.58µ, 5.76µ, 5.93µ, 6.65µ, 6.85µ, 8.18µ, 8.34µ, 8.47µ and 9.37µ (in methylene chloride) and at 2.97µ (shoulder), 3.03µ, 5.62µ, 5.87µ, 6.58µ, 6.59µ, 6.67µ, 7.65µ, 8.01µ, 9.67µ and 13.92µ (in mineral oil).

A solution of 5.03 g of 3-(N-2-iodethoxycarbonyl-amino)-2,2-dimethyl-6-(N-phenylacetyl-amino)-penam in 105 ml of absolute methylene chloride and 11 ml of absolute pyridine is cooled to about −10°C under a nitrogen atmosphere and treated with 91 ml of an 8 percent strength solution of phosphorous pentachloride in absolute methylene chloride. The reaction mixture is stirred for 30 minutes at 0°C, then again cooled to −10°C and treated with 50 ml of absolute ethanol. After 105 minutes at 0°C, the reaction mixture is diluted with 36 ml of water, the pH value of the two-phase solution is adjusted from 2.1 to 3.3 by adding about 12 ml of a 2 N aqueous sodium hydroxide solution, and the mixture is further stirred for 30 minutes at 0°C and then for 45 minutes at room temperature. The reaction mixture is poured out onto 120 ml of a 1 molar aqueous dipotassium phosphate solution and the pH value is adjusted to 7.0 by adding 50 percent strength aqueous tripotassium phosphate solution. The organic phase is separated off and twice washed with 40 ml portions of a saturated aqueous sodium chloride solution. The aqueous solutions are twice back-extracted with 100 ml portions of methylene chloride, and the combined organic solutions are dried over anhydrous magnesium sulphate and evaporated under reduced pressure and mild conditions (low temperature), and the residue is briefly dried under reduced pressure.

The amorphous, honey-coloured residue, in methylene chloride, is chromatographed on 100 g of silica gel (column), non-polar by-products being eluted with methylene chloride and with methylene chloride containing 3 percent of acetic acid methyl ester. 6-Amino-3-(N-2-iodethoxycarbonyl-amino)-2,2-dimethyl-penam is eluted with methylene chloride containing 5–20 percent of acetic acid methyl ester, and after repeated chromatography melts at 131°–134°C; $[\alpha]_D^{20} = +86° \pm 1°$ ($c = 0.974$ in chloroform); thin layer chromatography: $Rf = 0.18$ (system, 1:1 mixture of toluene:acetic acid ethyl ester), $Rf = 0.30$ (system, 4:1 mixture of chloroform:acetone) and $Rf = 0.58$ (system, 1:1 mixture of toluene:acetone); infrared absorption spectrum: characteristic bands in methylene chloride at 2.9–0µ, 5.60µ, 5.77µ, 6.18µ, 6.64µ, 6.85µ, 8.17µ, 8.34µ, 8.47µ, 9.25µ, 9.37µ, and 9.66µ, and in mineral oil at 2.98µ, 5.71µ, 5.79µ, 6.50µ, 7.61µ, 8.04µ, 8.39µ, 9.18µ, 9.72µ, 10.65µ and 11.54µ.

EXAMPLE 4:

A mixture of 0.005 g of 6-amino-3-(N-4-methoxybenzyloxy-carbonyl-amino)-2,2-dimethyl-penam and 1 ml of trifluoracetic acid is left to stand for 5 minutes at room temperature and is then evaporated at 0.1 mm Hg. The residue is taken up in a mixture of pyridine and toluene and again evaporated. The residue contains 4,4-dimethyl-5-thia-2,7-diazabicyclo[4.2.0] oct-2-en-8-one, which in a thin layer chromatogram (silica gel) shows an Rf value of 0.08 (system: toluene-acetone, 8:2) and of 0.22 (system: toluene-acetone, 6:4); melting point 152°–153°C (corrected), after crystallisation from a mixture of tetra-hydrofurane and diethyl ether.

If instead of 1 ml of trifluoracetic acid 1 ml of formic acid is used and the mixture is left to stand for 30 minutes, 4,4-dimethyl-5-thia-2,7-diazabicyclo[4.2.0]oct-2-en-8-one is again obtained.

0.051 g of 4,4-dimethyl-5-thia-2,7-diazabicyclo[4.2.0] oct-2-en-8-one and 0.1 g of zinc dust are taken up in a mixture of 0.5 ml of water, 1 ml of acetone and 0.2 ml of glacial acetic acid and the whole is shaken for 1 hour at 22°C. After filtering, the solution is distributed between 20 ml of acetic acid ethyl ester and 10 ml of 1 M aqueous dipotassium hydrogen phosphate solution; the aqueous phase is extracted with 20 ml of acetic acid ethyl ester. The combined organic solutions are washed with 10 ml of 1 M aqueous dipotassium hydrogen phosphate solution, dried over sodium sulphate and evaporated; 3-isopropyl-4-thia-2,6-diazabicyclo[3.2.0]heptan-7-one is thus obtained, which according to a thin layer chromatogram (silica gel; systems, toluene/acetone, 6:4 and 8:2) is a single substance, and after recrystallisation from a mixture of methylene chloride and hexane melts at 151°–155°C.

The starting material can be obtained as follows:

A solution of 4.61 g of crude 3-isocyanato-2,2-dimethyl-6-(N-phenylacetyl-amino)-penam in 50 ml of benzene is treated with 3.73 g of 4-methoxybenzyl alcohol and 0.2 ml of triethylamine and left to stand for 3 hours, and is then evaporated under reduced pressure. The residue is chromatographed on 250 g of silica gel; the fractions eluted with a 9:1 mixture of toluene and acetone contain the amorphous 3-(N-4-methoxybenzyloxycarbonyl-amino)-2,2-dimethyl-6-(N-phenylacetyl-amino)-penam, which in a thin layer chromatogram (silica gel) in the system toluene-acetone (8:2) shows an Rf value of 0.27, and in the system toluene-acetone (6:4) shows an Rf value of 0.59; infrared absorption spectrum (in methylene chloride): characteristic bands at 2.88μ, 5.56μ, 5.76μ, 5.91μ, 6.16μ, 6.64μ, 8.48μ and 9.67μ.

A solution of 3.0 g of 3-(N-4-methoxybenzyloxycarbonyl-amino)-2,2-dimethyl-6-(N-phenylacetyl-amino)-penam in a mixture of 65 ml of anhydrous methylene chloride and 7.1 ml of pyridine is treated under a nitrogen atmosphere, at −10°C, with 46 ml of a 10 percent strength solution of phosphorus pentachloride in methylene chloride, and subsequently the whole is stirred for 30 minutes at 0°C. 33 ml of absolute methanol are added thereto with intense cooling (−10°C), and the mixture is stirred for a further 2 hours. 22 ml of water are added, the pH value (measured in samples diluted with water) is adjusted to 3.3 with about 2 ml of a 2 N aqueous sodium hydroxide solution, and reaction is allowed to take place for half an hour at 0°C and for one hour at 20°C. The mixture is then poured out onto 140 ml of a 1 M aqueous dipotassium hydrogen phosphate buffer solution, whilst stirring, and the pH value is adjusted to 7.0 by adding 10.7 ml of a 50 percent strength aqueous tripotassium phosphate solution. The aqueous phase is separated off and washed three times with 140 ml portions of methylene chloride; the four organic solutions are each twice washed with 200 ml of water, combined, dried over sodium sulphate and evaporated under reduced pressure. The amorphous residue is digested with hexane; the hexane-insoluble component contains 6-amino-3-(N-4-methoxybenzyloxycarbonyl-amino)-2,2-dimethyl-penam, which in a thin layer chromatogram in the system toluene-acetone (8:2) shows an Rf value of 0.13 and in the system toluene-acetone (6:4) shows an Rf value of 0.32; infrared absorption spectrum (in methylene chloride); characteristic bands at 3.00μ, 5.62μ, 5.81μ, 6.21μ, 6.70μ, 8.54μ and 9.65μ.

EXAMPLE 5:

A solution of 0.150 g of 3,3-dimethyl-4-thia-2,6-diazabicyclo[3,2,0]heptan-7-one in 2 ml of a 9:1 mixture of dioxane and water, containing 0.02 g of p-toluenesulphonic acid, is treated with 0.6 ml of isobutyraldehyde and stirred for 3 hours under a nitrogen atmosphere at room temperature, the reaction being followed by means of a thin layer chromatogram (silica gel; system acetic acid ethyl ester; Rf of the starting material = 0.13, and Rf of the product = 0.40). The volatile constituents are evaporated off under reduced pressure, and the residue is dissolved in 20 ml of methylene chloride and washed with 2 ml of a saturated aqueous sodium hydrogen carbonate solution. After drying over sodium sulphate, the solvent is evaporated under reduced pressure. The crystalline residue consists of pure 3-isopropyl-4-thia-2,6-diazabicyclo[3,2,0]heptan-7-one, melting point 156°–157°C (corrected).

If the above reaction is carried out at 50°C instead of at room temperature, it is already complete after 15 minutes.

EXAMPLE 6:

0.064 g of 3,3-dimethyl-4-thia-2,6-diazabicyclo[3,2,0] heptan-7-one and 0.84 g of benzaldehyde are treated with a solution of 0.02 g of p-toluenesulphonic acid in 1 ml of dioxane, containing 10 percent of water. The mixture is heated for 30 minutes at 50°C under a nitrogen atmosphere and is then evaporated under reduced pressure. The residue is taken up in 30 ml of methylene chloride and 1 ml of a saturated aqueous sodium hydrogen carbonate solution; the organic phase is separated off, dried over sodium sulphate and evaporated. The solid residue is purified by means of thin layer chromatography (silica gel; system: acetic acid ethyl ester; Rf = 0.40) and is dissolved from the plate by means of a 9:1 mixture of methylene chloride and methanol. The 3-phenyl-4-thia-2,6-diazabicyclo[3,2,0]heptan-7-one thus obtainable, of formula

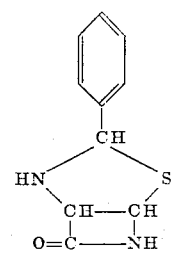

melts at 185°–188°C and shows characteristic bands in the infrared absorption spectrum at 2.95μ (in potassium bromide) and 5.69μ (in a mixture of methylene chloride and methanol).

The products of the process, such as for example the preferred 3-isopropyl-4-thia-2,6-diazabicyclo[3,2,0-]heptan-7-one, can for example be further converted as follows:

EXAMPLE 7:

A solution of 1.64 g of 3-isopropyl -4-thia-2,6-diazabicyclo[3.2.0]heptan-7-one in 33 ml of a 1:1 mixture of acetic acid and water is treated, over the course of 10 minutes, with 71.7 ml of an 0.5 N solution of iodine in ethanol, and the whole is left to stand for one hour at room temperature and then concentrated under reduced pressure. The residue is dried in a high vacuum, suspended in 90 ml of acetonitrile, and treated with 4.5 ml of pyridine and 4.5 ml of phenylacetic acid chloride at 0°C. The mixture is left to stand for 15 minutes at 0°C and for one hour at room temperature, and is then evaporated under reduced pressure. The product is triturated for 30 minutes with 10 ml of a 1:1 mixture of dioxane and water, and the residue is taken up in acetic acid ethyl ester; the solution is washed with a saturated aqueous sodium hydrogen carbonate solution and a saturated aqueous sodium chloride solution, dried and evaporated. The oily residue is chromatographed on 100 g of pure silica gel; the oily bis-[2-oxo-3β-(N-phenylacetyl-amino)-4β-azetidinyl]-disulphide is eluted with a 19:1 mixture of acetic acid ehtyl ester and acetone and is converted into a finely pulverulent, amorphous form by lyophilisation; thin layer chromatogram (silica gel): Rf∼0.36 (system: acetic acid ethyl ester/acetone, 1:1); infrared absorption spectrum (in potassium bromide): characteristic bands at 3.08μ, 5.62μ, 5.97μ and 6.51μ.

A solution of 0.35 g of bis-[2-oxo-3β-(N-phenylacetyl-amino)4β-azetidinyl]disulphide in 16 ml of a 9:1 mixture of acetic acid and water is treated, at about 5°C, with about 3.2 g of ethylene oxide and then with 3.5 g of zinc dust. The reaction mixture is stirred for 15 minutes at about 5°C and for 30 minutes at room temperature, and is then filtered. The filter residue is rinsed with acetone and the filtrate is evaporated. The residue is taken up in about 150 ml of acetic acid ethyl ester and the solution is washed with 50 ml of a saturated aqueous sodium hydrogen carbonate solution and with 100 ml of a saturated aqueous sodium chloride solution, dried and evaporated. The residue, together with a crude product obtained analogously from 0.58 g of bis-[2-oxo-3β-(N-phenylacetyl-amino)-4β-azetidinyl]-disulphide, is chromato-graphed on 50 g of silica gel. Elution with a 19:1 mixture of ethyl acetate and acetone yields 4β-(2-hydroxyethylmercapto)-3β-(N-phenylacetyl-amino)-azetidin-2-one as a single product, which after crystallisation from a mixture of acetone and diethyl ether melts at 141°-142°C; $[\alpha]_D^{20} = +44° \pm 2°$ ($c = 0.571$ in ethanol); thin layer chromatography (silica gel; development with iodine): Rf 0.45 (system: acetic acid ethyl ester/acetone, 1:1); infrared absorption spectrum (in mineral oil): characteristic bands at 3.01μ, 5.68μ, 6.01μ, 6.43μ and 6.52μ.

A solution of 0.61 g of 4β-(2-hydroxyethylmercapto)-3β-(N-phenylacetyl-amino)-azetidin-2-one in 10 ml of tetrahydrofurane is treated dropwise, at 0°C, with 1.38 g of chloroformic acid 2,2,2-trichlorethyl ester in 5 ml of tetrahydrofurane, and then with 1.06 g of pyridine in 5 ml of tetrahydrofurane. The reaction mixture is stirred for 15 minutes at 0°C and for 2 hours at room temperature, under a nitrogen atmosphere, and is then taken up in 150 ml of methylene chloride. The solution is washed with a saturated aqueous sodium chloride solution, dried and evaporated. The residue is chromatographed on a 50-fold quantity of silica gel; 3β-(N-phenylacetyl-amino)-4β-[2-(2,2,2-trichlorethoxycarbonyl-oxy)-ethylmercapto]-azetidin-2-one is eluted with a 1:1 mixture of methylene chloride and acetic acid ethyl ester. After crystallisation and a single recrystallisation from diethyl ether, the product is obtained in the form of colourless needles, melting point 99°-101°C; thin layer chromatogram (silica gel): Rf~0.46 (system: acetic acid ethyl ester; development with iodine); $[\alpha]_D^{20} = +3° \pm 2°$ ($c = 0.518$ in chloroform); infrared absorption spectrum (in methylene chloride): characteristic bands at 2.88μ, 5.58μ, 5.64μ, 5.92μ and 6.62μ.

A mixture of 1.0 g of 3β-(N-phenylacetyl-amino)-4β-[2-(2,2,2-trichlorethoxycarbonyloxy)-ethylmercapto]-azetidin-2-one and 3.0 g of glyoxylic acid tert.-butyl ester hydrate in 50 ml of benzene is boiled for 16 hours under reflux, with water being separated off, and is then cooled, twice washed with 25 ml portions of distilled water, dried over sodium sulphate and evaporated. α-Hydroxy-α-{2-oxo-3β-(N-phenyl-acetyl-amino)-4β-[2-(2,2,2-trichlorethoxycarbonyloxy)-ethylmercapto]-1-azetidinyl}-acetic acid tert.-butyl ester is thus obtained, and this is used further without purification.

The crude α-hydroxy-α-{2-oxo-3β-(N-phenylacetyl-amino)-4β-[2-(2,2,2-trichlorethoxycarbonyloxy)-ethylmercapto]-1-azetidinyl}-acetic acid tert.-butyl ester obtainable according to the above process is dissolved in 20 ml of a 1:1 mixture of dioxane and tetrahydrofurane and treated dropwise, at −10°C, with 0.54 ml of pyridine in 2 ml of dioxane and 0.48 ml of thionyl chloride in 10 ml of a 1:1 mixture of dioxane and tetrahydrofurane. The reaction mixture is stirred for 30 minutes at −10°C to −5°C and for 1 hour under a nitrogen atmosphere, the precipitate is filtered off and the filtrate containing the α-chlor-α-{2-oxo-3β-(N-phenylacetyl-amino)-4β-[2-(2,2,2-trichlorethoxycarbonyloxy)-ehtylmercapto]-1-azetidinyl}-acetic acid tert.-butyl ester is evaporated; the product is further used in the crude state.

A solution of the crude α-chlor-α{2-oxo-3β-(N-phenyl-acetyl-amino)-4β-[2-(2,2,2-trichlorethoxycarbonyloxy)-ethyl-mercapto]-1-azetidinyl}-acetic acid tert.-butyl ester, obtainable according to the above process, in 30 ml of a 1:1 mixture of dioxane and tetrahydrofurane, is treated with 1.15 g of triphenylphosphine and 0.35 ml of pyridine, and the mixture is warmed for 2 hours at 50°C and then evaporated to dryness. The residue is chromatographed on 30 g of pure silica gel, and elution with a 1:1 mixture of toluene and acetic acid ethyl ester yeilds α-{2-oxo-3β-(N-phenylacetyl-amino)-4β-[2-(2,2,2-trichlorethoxycarbonyloxy)-ethylmercapto]-1-azetidinyl}-α-triphenylphosphoranylidene-acetic acid tert.-butyl ester, which is contaminated with a little triphenyl-phosphine oxide and which can be purified by means of preparative thin layer chromatography (silica gel; dvelopment with iodine); Rf~0.57 (system: toluene/acetone, 1:1); infrared absorption spectrum (in methylene chloride): characteristic bands at 3.00μ, 3.42μ, 5.68μ, 5.97μ, 6.10μ and 6.65μ.

A mixture of 0.225 g of α-{2-oxo-3β-(N-phenylacetyl-amino)-4β-[2-(2,2,2-trichlorethoxycarbonyloxy)-ethylmercapto]-1-azetidinyl}-α-triphenylphosphoranylidene-acetic acid tert.-butyl ester in 10 ml of a 9:1 mixture of acetic acid and water is treated with 3.0 g of zinc dust and stirred for 45 minutes at 15°C. The mixture is filtered and the filtrate is evaporated; the residue is taken up in 50 ml of acetic acid ethyl ester and the solution is washed with 25 ml of a saturated aqueous sodium hydrogen carbonate solution and twice washed with 25 ml portions of a saturated aqueous sodium chloride solution, dired over sodium sulphate and evaporated. α-[4β-(2-Hydroxyethylmercapto)-2-oxo-3β-(N-phenylacetyl-amino)-1-azetidinyl]-α-triphenylphosphoranylidene-acetic acid tert.-butyl ester is thus obtained; thin layer chromatogram (silica gel; development with iodine): Rf~0.24 (system: toluene/acetone, 1:1).

A mixture of 0.221 g of the crude α-[4β-(2-hydroxyethylmercapto)-2-oxo-3β-(N-phenylacetylamino)-1-azetidinyl]-α-triphenylphosphoranylidene-acetic acid tert.-butyl ester in 5 ml of dimethylsulphoxide and 5 ml of acetic anhydride is left to stand for 16 hours at room temperature and is then concentrated under reduced pressure. The residue is taken up in 100 ml of toluene; the organic solution is washed three times with 50 ml portions of distilled water, dired over sodium sulphate and evaporated. The oily residue is chromatographed on 10 g of silica gel; the desired 7-(N-phenylacetyl-amino)-ceph-3-em-4-carboxylic acid tert.-butyl ester, which forms by cyclisation from the α-[4β-formylmethyl-mercapto-2-oxo-3β-(N-pbenylacetyl-amino)-1-azetidinyl]-α-triphenylphosphoranylidene-acetic acid tert.-butyl ester which is obtained as an intermediate and is not isolated, is eluted with a 4:1 mixture of toluene and acetic acid ethyl ester; thin layer chromatogram (silica gel): Rf~0.48 (system: toluene/acetic acid ethyl ester, 1:1); ultraviolet absorption spectrum (in pure ethanol): $\lambda_{max}$ 258 mμ; infrared absorption spectrum (in methylene chloride): characteristic bands at 3.00μ, 3.48μ, 5.62μ, 5.81μ, 5.93μ, 6.10μ, 6.67μ, 7.15μ, 7.31μ, 7.70μ, 8.65μ and 9.03μ.

A mixture of 0.03 g of 7-(N-phenylacetyl-amino)-ceph-3-em-4-carboxylic acid tert.-butyl ester and 0.5 ml of trifluoroacetic acid is left to stand for one hour at room temperature. The trifluoroacetic acid is then removed under reduced pressure and the residue is twice evaporated to dryness with 5 ml portions of a mixture of benzene and chloroform. The residue is chromatographed on 5 g of silica gel and the 7-(N-phenylacetyl-amino)-ceph-3-em-4-carboxylic acid is eluted with methylene chloride containing 5 percent of acetone; thin layer chromatogram (silica gel: development with iodine):Rf∼0.49 (system: n-butanol/pyridine/acetic acid/water, 40:24:6:30).

We claim:

1. 2-$R_1$-3-$R_2$-4-Thia-2,6-diazabicyclo[3.2.0]heptan-7-one compounds of formula

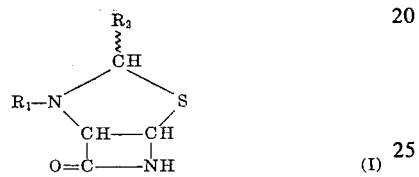

(I)

wherein $R_1$ represents a member selected from the group consisting of hydrogen and the acyl radical Ac of a half-ester of carbonic acid which can easily be split off under acid conditions, and $R_2$ represents a member selected from the group consisting of hydrogen, isopropyl and phenyl.

2. Compounds having the formula I as claimed in claim 1, in which $R_1$ represents a member selected from the group consisting of hydrogen and an acyl radical of a half-ester of carbonic acid which can easily be split off under acid conditions, and $R_2$ represents a member selected from the group consisting of hydrogen and isopropyl.

3. A compound as claimed in claim 1 and being the 3-isopropyl-4-thia-2,6-diazabicyclo[3.2.0]heptan-7-one.

4. A compound as claimed in claim 1 and being 3-phenyl-4-thia-2,6-diazabicyclo[3.2.0]heptan-7-one.

* * * * *